US009793571B2

(12) United States Patent
Yanagi

(10) Patent No.: US 9,793,571 B2
(45) Date of Patent: Oct. 17, 2017

(54) APPARATUS FOR BONDING SEPARATORS IN ELECTRICAL DEVICES

(71) Applicant: Nissan Motor Co., Ltd., Yokohama-shi, Kanagawa (JP)

(72) Inventor: Takahiro Yanagi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/913,548

(22) PCT Filed: Oct. 2, 2014

(86) PCT No.: PCT/JP2014/076453
§ 371 (c)(1),
(2) Date: Feb. 22, 2016

(87) PCT Pub. No.: WO2015/050228
PCT Pub. Date: Apr. 9, 2015

(65) Prior Publication Data
US 2016/0211544 A1    Jul. 21, 2016

(30) Foreign Application Priority Data

Oct. 3, 2013   (JP) .................................. 2013-208639
Dec. 18, 2013  (JP) .................................. 2013-261867

(51) Int. Cl.
*B32B 37/00*    (2006.01)
*H01M 10/04*    (2006.01)
(Continued)

(52) U.S. Cl.
CPC ......... *H01M 10/0404* (2013.01); *B23K 20/10* (2013.01); *B29C 65/08* (2013.01);
(Continued)

(58) Field of Classification Search
CPC .. H01M 2/145; H01M 10/0404; B23K 20/10; B29C 65/08; B29C 65/081; B29C 65/7841; B29C 66/322
(Continued)

(56) References Cited

U.S. PATENT DOCUMENTS 4,026,000 A     5/1977   Anderson
2004/0011452 A1*  1/2004   Capodieci ............. B29C 65/087
                                                           156/73.3
2015/0303426 A1  10/2015  Kim et al.

FOREIGN PATENT DOCUMENTS

CA        1072628 A     2/1980
CN      102672339 A     9/2012
(Continued)

*Primary Examiner* — James Sells
(74) *Attorney, Agent, or Firm* — Global IP Counselors, LLP

(57) ABSTRACT

An apparatus for bonding separators in electrical devices the separators to each other so as to sandwich an electrode, includes a transmission unit configured to generate ultrasonic oscillations, an amplifier unit configured to amplify the generated oscillations, an abutting part configured to apply the amplified oscillations to the separators so as to bond the separators to each other, and separator conveyance units configured to convey the separators to a bonding position where the abutting part bonds the pair of separators to each other, the transmission unit, the amplifier unit, and the abutting part are laid out parallel to a direction in which the separators are conveyed.

20 Claims, 13 Drawing Sheets

(51) Int. Cl.
*H01M 2/14* (2006.01)
*B23K 20/10* (2006.01)
*B29C 65/08* (2006.01)
*B29C 65/00* (2006.01)
*B29C 65/78* (2006.01)
*B29C 65/82* (2006.01)
*B29L 31/34* (2006.01)

(52) U.S. Cl.
CPC .......... *B29C 65/081* (2013.01); *B29C 65/787* (2013.01); *B29C 65/7841* (2013.01); *B29C 65/7847* (2013.01); *B29C 65/7891* (2013.01); *B29C 65/8253* (2013.01); *B29C 66/1122* (2013.01); *B29C 66/433* (2013.01); *B29C 66/71* (2013.01); *B29C 66/72325* (2013.01); *B29C 66/81429* (2013.01); *B29C 66/81463* (2013.01); *B29C 66/83221* (2013.01); *H01M 2/145* (2013.01); *B29L 2031/3468* (2013.01)

(58) Field of Classification Search
USPC .................................. 156/73.1, 580.1, 580.2
See application file for complete search history.

(56) References Cited

FOREIGN PATENT DOCUMENTS

| | | |
|---|---|---|
| EP | 0 397 640 A2 | 11/1990 |
| JP | 62-202462 A | 9/1987 |
| JP | 9-108855 A | 4/1997 |
| JP | 9-253869 A | 9/1997 |
| JP | 9-320636 A | 12/1997 |
| JP | 2005-150219 A | 6/2005 |
| JP | 2007-62010 A | 3/2007 |
| JP | 2009-22977 A | 2/2009 |
| JP | 2012-4871 A | 1/2012 |
| JP | 2012-59696 A | 3/2012 |
| JP | 2013-143337 A | 7/2013 |
| WO | 2013/105630 A1 | 7/2013 |

* cited by examiner

US 9,793,571 B2

APPARATUS FOR BONDING SEPARATORS IN ELECTRICAL DEVICES

CROSS-REFERENCE TO RELATED APPLICATIONS

This application is a U.S. National Stage Application of International Application No. PCT/JP2014/076453, filed Oct. 2, 2014, which claims priority to Japanese Patent Application No. 2013-208639 filed in the Japan Patent Office on Oct. 3, 2013 and to Japanese Patent Application No. 2013-261867 filed in the Japan Patent Office on Dec. 18, 2013, the contents of each of which is hereby incorporation herein by reference.

TECHNICAL FIELD

The present invention relates to an apparatus for bonding separators in electrical devices.

BACKGROUND INFORMATION

Conventionally, batteries such as lithium ion secondary batteries are formed by sealing the power generating elements which carry out charge/discharge with an exterior material. A power generating element is, for example, configured by alternately stacking multiple negative electrodes and bagged electrodes, which are formed by sandwiching a positive electrode with a pair of separators. In a bagged electrode, short circuiting with the negative electrode that is adjacent across a separator is prevented, by suppressing the movement of the positive electrode by bonding the two ends thereof (for example, refer to Japanese Laid-Open Patent Application No. 1997-320636). In addition, there are those that use ultrasound for bonding the components of a secondary battery (for example, refer to Japanese Laid Open Patent Application No. 2012-59696).

SUMMARY

When performing bonding using ultrasound to bond the components of electrical devices such as a secondary battery, bonding between members that are thin like foil, having high temperature characteristics can be achieved. However, units that use ultrasound have complex structures, such as an oscillator for generating ultrasound, a booster for amplifying oscillations, etc.; therefore, when disposed on a mass production line on which various equipment is arranged, the dimension of the equipment as a whole becomes large, creating a problem that space in buildings such as factories will be pressured.

In order to solve the problem described above, the present invention provides an apparatus for bonding separators in electrical devices wherein even if a unit that performs bonding using ultrasound is used in assembly-line equipment, the amount of space taken up by said equipment can be kept small.

The present invention which achieves the object above is an apparatus for bonding separators in electrical devices used to bond a pair of separators to each other so as to sandwich an electrode. The apparatus includes a transmission unit that generates ultrasonic oscillations, an amplifier unit that amplifies the generated oscillations, an abutting part that applies the amplified oscillations to the pair of separators so as to bond said separators to each other, and separator conveyance units that convey the pair of separators to a bonding position where the abutting part bonds said separators to each other. In the present invention, the transmission unit, the amplifier unit, and the abutting part are laid out in a plane that is parallel to the direction in which the separators are conveyed.

BRIEF DESCRIPTION OF THE DRAWINGS

Referring now to the attached drawings which form a part of this original disclosure.

DETAILED DESCRIPTION OF THE EMBODIMENTS

Figure 1:
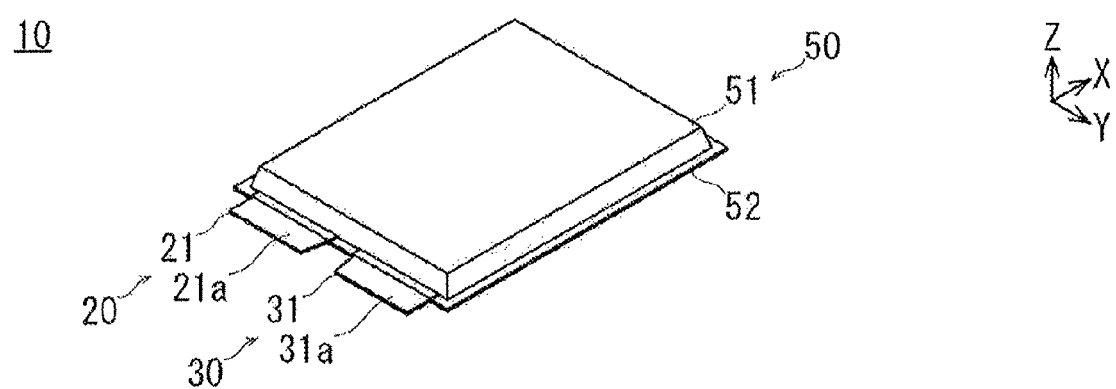
FIG. 1 is a perspective view illustrating a lithium ion secondary battery configured using an electrical device (bagged electrode) according to one embodiment of the present invention.

Embodiments according to the present invention will be described below, with reference to the appended drawings. In the explanations of the drawings, the same elements are given the same codes, and overlapping explanations are omitted. The sizes and ratios of the members in the drawing are exaggerated for convenience of explanation, and may be different from the actual sizes and ratios. In all the drawings from FIG. 1 to FIG. 14C, the orientation is shown using arrows represented by X, Y, and Z. The direction of the arrow indicated by X indicates the direction X in which the ceramic separators 40 and positive electrode 20 are conveyed. The direction of the arrow indicated by Y indicates the direction Y that intersects the direction in which the ceramic separators 40 and positive electrode 20 are conveyed. The direction of the arrow indicated by Z indicates the direction Z in which the ceramic separators 40 and positive electrode 20 are stacked.

Electrical Device

The electrical device formed by bonding by the apparatus 100 for bonding separators corresponds to, for example, bagged electrodes 11 of a lithium ion secondary battery 10, as illustrated in FIG. 1 thru FIG. 4. The lithium ion secondary battery 10 is formed by sealing power generating elements 12 which carry out charge/discharge with an exterior material 50. A power generating element 12 is configured by alternately stacking negative electrodes 30 and bagged electrodes 11, which are formed by bonding after sandwiching a positive electrode 20 with a pair of ceramic separators 40.

Even if the lithium ion secondary battery 10 is oscillated or receives impact, short circuiting is prevented between a positive electrode 20 and a negative electrode 30, which are adjacent to each other via a ceramic separator 40, by suppressing the movement of the positive electrode 20 with bonding portions 40h formed at both ends of a pair of ceramic separators 40. The bonding portion 40h is formed by partially melting polypropylene layers 41 in a state in which ceramic layers 42 are opposed to each other, while moving the ceramic layer 42 adjacent to the polypropylene layer 41 to be melted to the peripheral region and made coarse, and welding the opposed polypropylene layers 41 to each other.

The apparatus 100 for bonding separators is illustrated in FIG. 5A-FIG. 7 and the like. The apparatus 100 for bonding separators is used when bonding electrical devices (the bagged electrode 11 of the lithium ion secondary battery 10). The apparatus 100 for bonding separators bonds ceramic separators 40 to each other, comprising a sheet-like molten material (corresponding to the polypropylene layer 41), and a molten material that is laminated on a polypropylene layer 41 and that has a higher melting temperature than the polypropylene layer 41 (corresponding to the polypropylene layer 41).

The apparatus 100 for bonding separators comprises an electrode conveyance unit 110 for conveying electrodes (positive electrode 20 or negative electrode 30), a first separator conveyance unit 120 for conveying a ceramic separator 40 that is laminated on one surface of the positive electrode 20 (corresponding to the separator conveyance unit), and a second separator conveyance unit 130 for conveying a ceramic separator 40 that is laminated on the other surface of the positive electrode 20 (corresponding to the separator conveyance unit). In addition, the apparatus 100 for bonding separators comprises a separator holding unit 140 for holding a pair of ceramic separators 40 that sandwich a positive electrode 20, a separator bonding unit 150 for bonding a pair of ceramic separators 40 to each other, and a separator conveyance following unit 160 that follows the conveyance operation of the bagged electrode conveyance unit 170, while the ceramic separators 40 are being bonded to each other. The apparatus 100 for bonding separators further comprises a bagged electrode conveyance unit 170 that conveys the bagged electrode 11, and a control unit 180 that controls the respective operation of each component member.

First, the bagged electrode 11 which is formed by bonding with the apparatus 100 for bonding separators will be described with reference to FIG. 1 thru FIG. 4, based on the configuration of the lithium ion secondary battery 10, which includes the bagged electrode 11.

Figure 2:
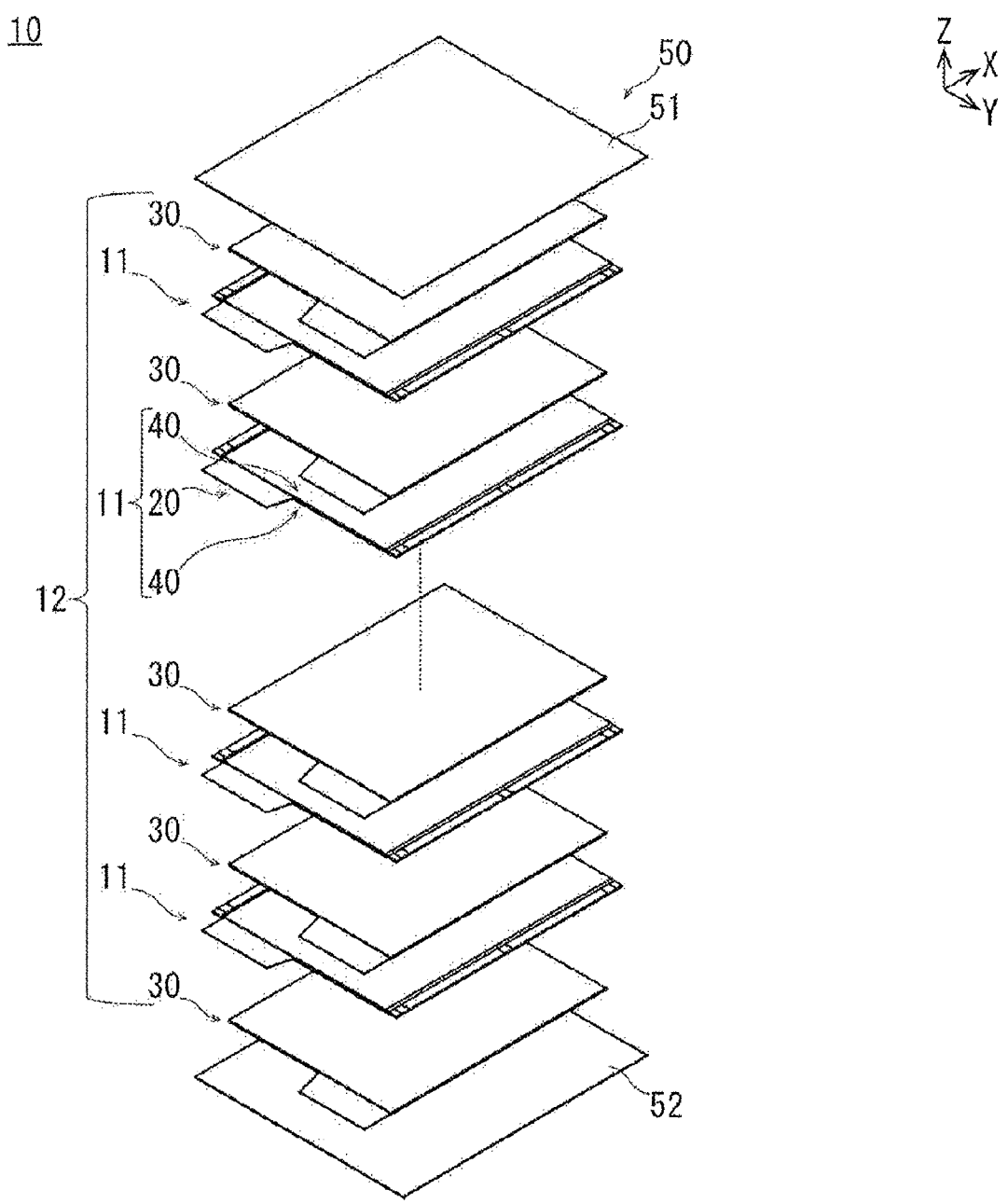
FIG. 2 is an exploded perspective view illustrating the lithium ion secondary battery of FIG. 1 exploded into each component member.
Figure 3:
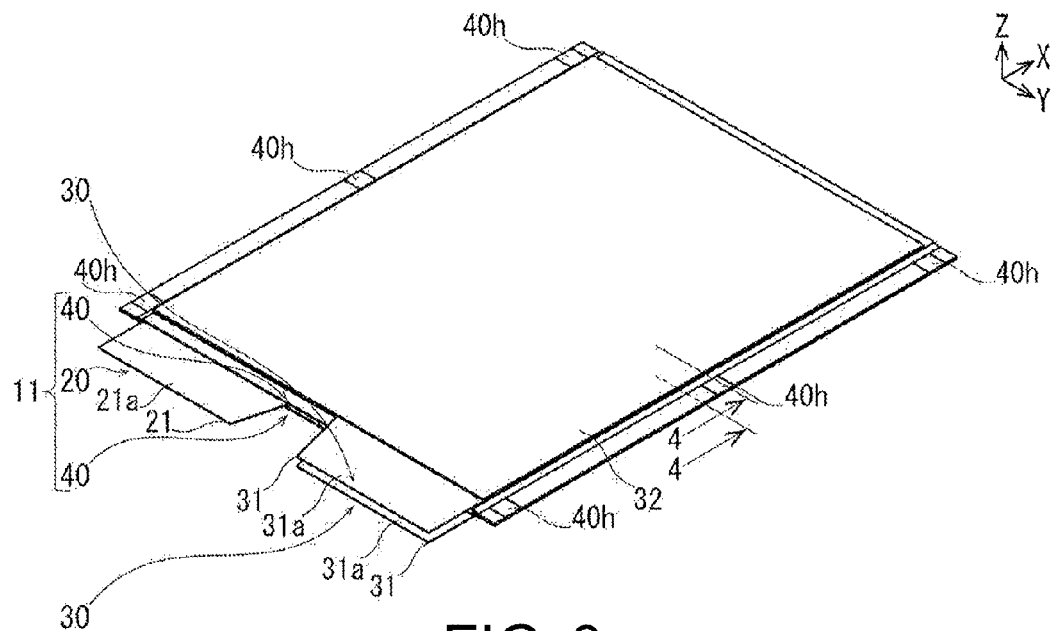
FIG. 3 is a perspective view illustrating a state in which negative electrodes are respectively laminated on both sides of the bagged electrode of FIG. 1.
Figure 4:
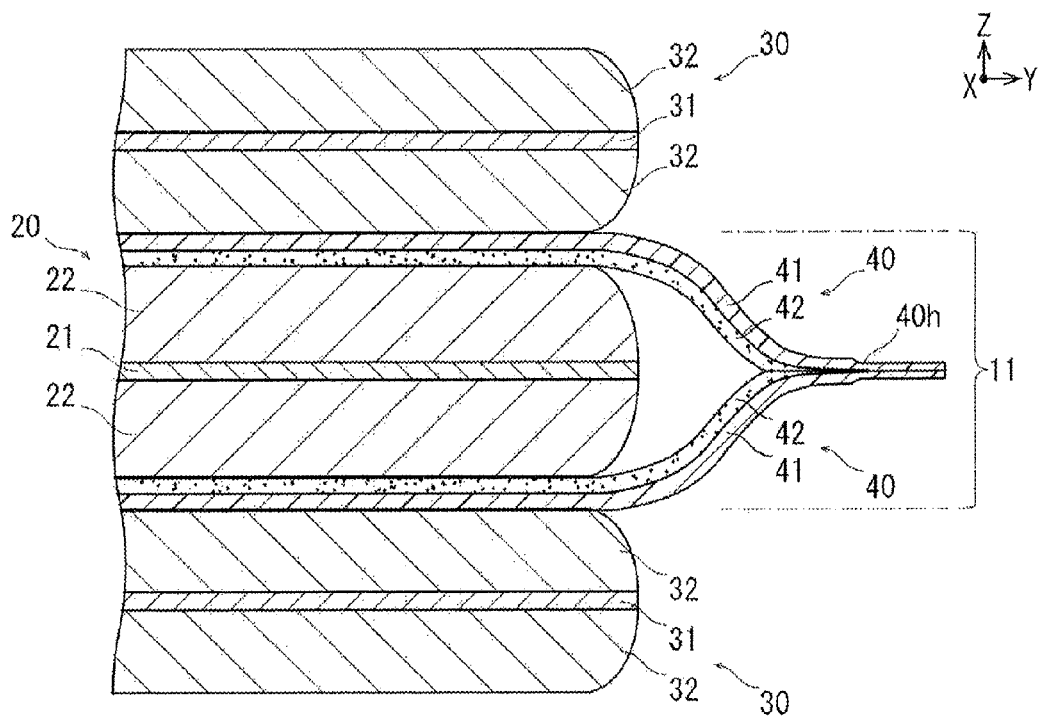
FIG. 4 is a partial cross-sectional view illustrating the configuration of FIG. 3 along the 4-4 line shown in FIG. 3.

FIG. 1 is a perspective view illustrating a lithium ion secondary battery 10 formed using an electrical device (bagged electrode 11). FIG. 2 is an exploded perspective view illustrating the lithium ion secondary battery 10 of FIG. 1 exploded into each component member. FIG. 3 is a perspective view illustrating a state in which negative electrodes 30 are respectively laminated on both sides of the bagged electrode 11 of FIG. 1. FIG. 4 is a partial cross-sectional view illustrating the configuration of FIG. 3 along the 4-4 line shown in FIG. 3.

The positive electrode 20 corresponds to an electrode, and is formed by binding positive electrode active material 22 on both surfaces of a positive electrode current collector 21, which is a conductive body. A positive electrode terminal 21a that takes out power is formed extending from a portion of one end of the positive electrode current collector 21. The positive electrode terminals 21a of the multiple laminated positive electrodes 20 are fixed to each other by welding or adhesion.

Examples of materials used for the positive electrode current collector 21 of the positive electrode 20 include aluminum expanded metal, aluminum mesh, and aluminum punched metal. Examples of materials used for the positive electrode active material 22 of the positive electrode 20 include various oxides (lithium manganese oxides such as $LiMn_2O_4$, manganese dioxide, lithium nickel oxides such as $LiNiO_2$, lithium cobalt oxides such as $LiCoO_2$, lithium-containing nickel cobalt oxides, or amorphous vanadium pentoxide containing lithium) and chalcogen compounds (titanium disulfide, molybdenum disulphide).

The negative electrode 30 corresponds to an electrode with a different polarity than the positive electrode 20, and is formed by binding a negative electrode active material 32 on both surfaces of a negative electrode current collector 31, which is a conductive body. A negative electrode terminal 31a is formed extending from a portion of one end of the negative electrode current collector 31 so as to not overlap with the positive electrode terminal 21a formed on the positive electrode 20. The longitudinal length of the negative electrode 30 is longer than the longitudinal length of the positive electrode 20. The lateral length of the negative electrode 30 is the same as the lateral length of the positive electrode 20. The negative electrode terminals 31a of the multiple laminated negative electrodes 30 are fixed to each other by welding or adhesion.

Examples of materials used for the negative electrode current collector 31 of the negative electrode 30 include copper expanded metal, copper mesh, and copper punched metal. A carbon material that absorbs and releases lithium ions is used as a material for the negative electrode active material 32 of the negative electrode 30. Examples of such carbon material used include natural graphite, artificial graphite, carbon black, activated carbon, carbon fiber, cola, or carbon synthesized by thermal treating an organic precursor (phenol resins, polyacrylonitrile, or cellulose) in an inert atmosphere.

The ceramic separator 40 is disposed between the positive electrode 20 and the negative electrode 30, and electrically isolates the positive electrode 20 and the negative electrode 30. The ceramic separator 40 holds an electrolytic solution between the positive electrode 20 and the negative electrode 30 to ensure conductance of ions. The ceramic separator 40 is formed in a rectangular shape. The longitudinal length of the ceramic separator 40 is longer than the longitudinal length of the negative electrode terminal 30 excluding the negative electrode terminal 31*a* portion.

The ceramic separator 40 is formed by, for example, laminating a ceramic layer 42 corresponding to a heat-resistant material to a polypropylene layer 41 corresponding to a molten material, as illustrated in FIG. 4. The ceramic layer 42 has a higher melting temperature than the polypropylene layer 41. A pair of ceramic separators 40 sandwich a positive electrode 20, and ceramic layers 42 thereof are laminated facing each other. The ceramic layers 42 are in contact with the positive electrode active material 22 of the positive electrode 20.

The polypropylene layer 41 of the ceramic separator 40 is configured forming a sheet of polypropylene. The polypropylene layer 41 is impregnated with a nonaqueous electrolyte solution prepared by dissolving electrolytes in a nonaqueous solvent. Polymers are contained in order to retain the nonaqueous electrolyte solution in the polypropylene layer 41. The ceramic layer 42 is formed by, for example, applying ceramic obtained by molding an inorganic compound at a high temperature onto the polypropylene layer 41 and drying. The ceramic comprises a porous material formed by a binding between a binder and ceramic particles such as silica, alumina, zirconium oxide, and titanium oxide.

The pair of ceramic separators 40 are bonded to each other by multiple bonding portions 40*h* respectively formed at both ends in the longitudinal direction along the conveyance direction X of the apparatus 100 for bonding separators. The bonding portion 40*h* is formed by partially melting polypropylene layers 41 in a state in which ceramic layers 42 are opposed to each other, while moving the ceramic layer 42 adjacent to the polypropylene layer 41 to the peripheral region and made coarse, and welding the opposed polypropylene layers 41 to each other.

A pair of ceramic separators 40 are laminated so as to sandwich the two surfaces of a positive electrode 20 and bagged to configure a bagged electrode 11. For example, a total of three bonding portions 40*h* are each formed at the two ends and the central portion on both sides of the pair of ceramic separators 40 along the longitudinal direction. Even if the lithium ion secondary battery 10 is oscillated or receives impact, the movement of the positive electrode 20 in the bagged electrode 11 can be suppressed, with bonding portions 40*h* formed at both ends of the ceramic separators 40 in the longitudinal direction. That is, short circuiting is prevented between the positive electrode 20 and the negative electrode 30 which are adjacent to each other via the ceramic separator 40. Therefore, the lithium ion secondary battery 10 is able to maintain the desired electrical characteristics.

The exterior material 50 is configured, for example, from laminated sheets 51 and 52 which comprise metal plates inside, and coats a power generating element 12 from both sides to form a seal. When sealing the power generating element 12 with the laminated sheets 51 and 52, a portion of the periphery of the laminated sheets 51 and 52 is opened while the other peripheral portions are sealed by thermal welding or the like. An electrolytic solution is injected from the opened portions of the laminated sheets 51 and 52 to impregnate the ceramic separators 40, etc., in the electrolytic solution. Air is removed by reducing the inside pressure from the opened portions of the laminated sheets 51 and 52, and the opened portions also heat-sealed to form a complete seal.

The laminated sheets 51 and 52 of the exterior material 50 form, for example, a three-layer structure by each laminating three types of materials. The first layer corresponds to a thermal adhesive resin; for example, polyethylene (PE), ionomer, or ethylene vinyl acetate (EVA) is used. The material of the first layer is placed adjacent to the negative electrode 30. The second layer corresponds to a metal formed into a foil; for example, an Al foil or a Ni foil is used. The third layer corresponds to a resin film; for example, rigid polyethylene terephthalate (PET) or nylon is used.

Apparatus for Bonding Separators in Electrical Devices

Next, each component member (electrode conveyance unit 110, first separator conveyance unit 120, second separator conveyance unit 130, separator holding unit 140, separator bonding unit 150, separator conveyance following unit 160, bagged electrode conveyance unit 170, and control unit 180) of an apparatus 100 for bonding separators that embodies the method of bonding separators in electrical devices (corresponding to the bagged electrode 11 of the lithium ion secondary battery 10) will be described in order, with reference to FIG. 5A thru FIGS. 12A-12C.

Figure 5A:
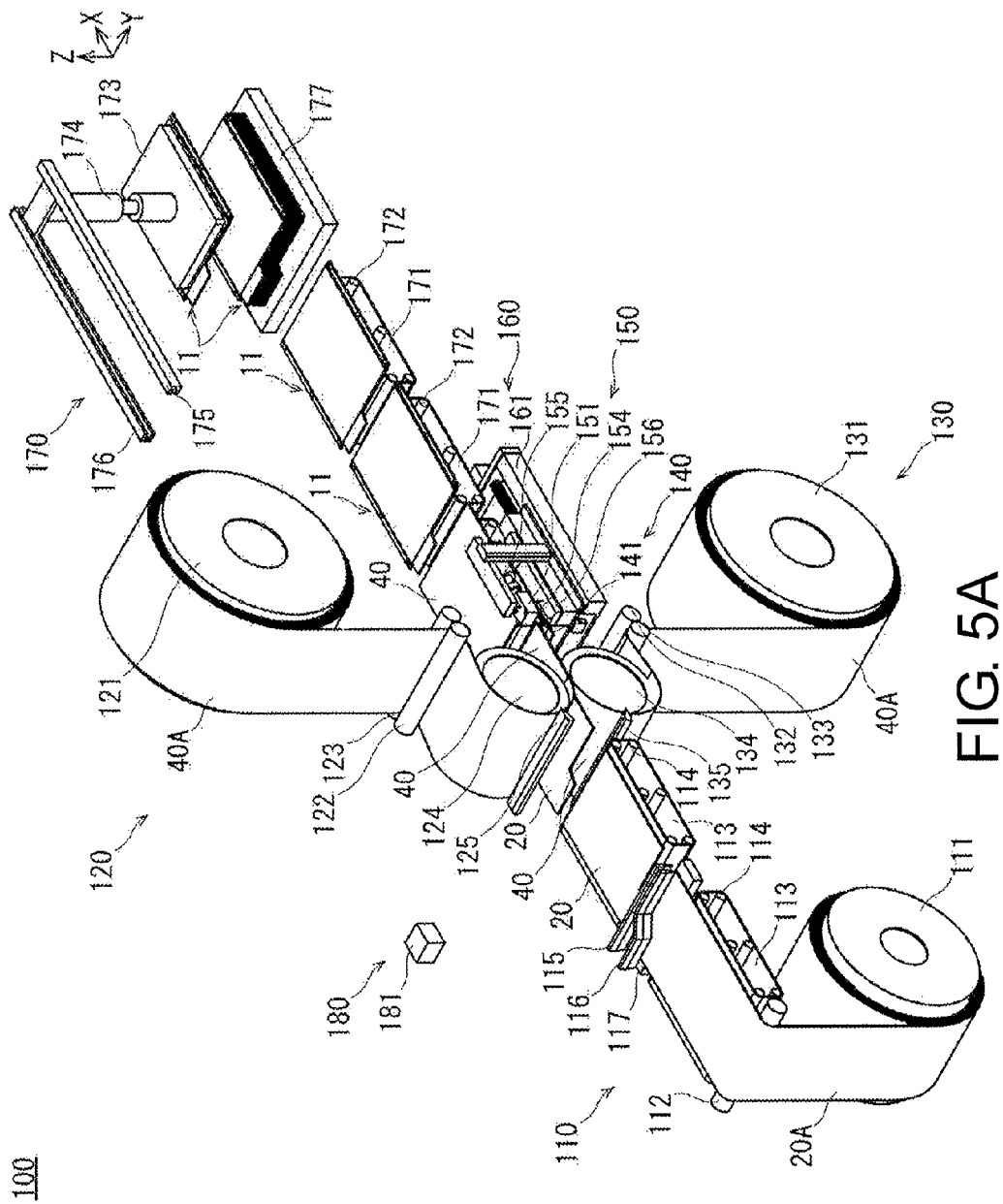
FIG. 5A is a perspective view illustrating the apparatus for bonding separators in electrical devices according to one embodiment of the present invention.
Figure 5B:
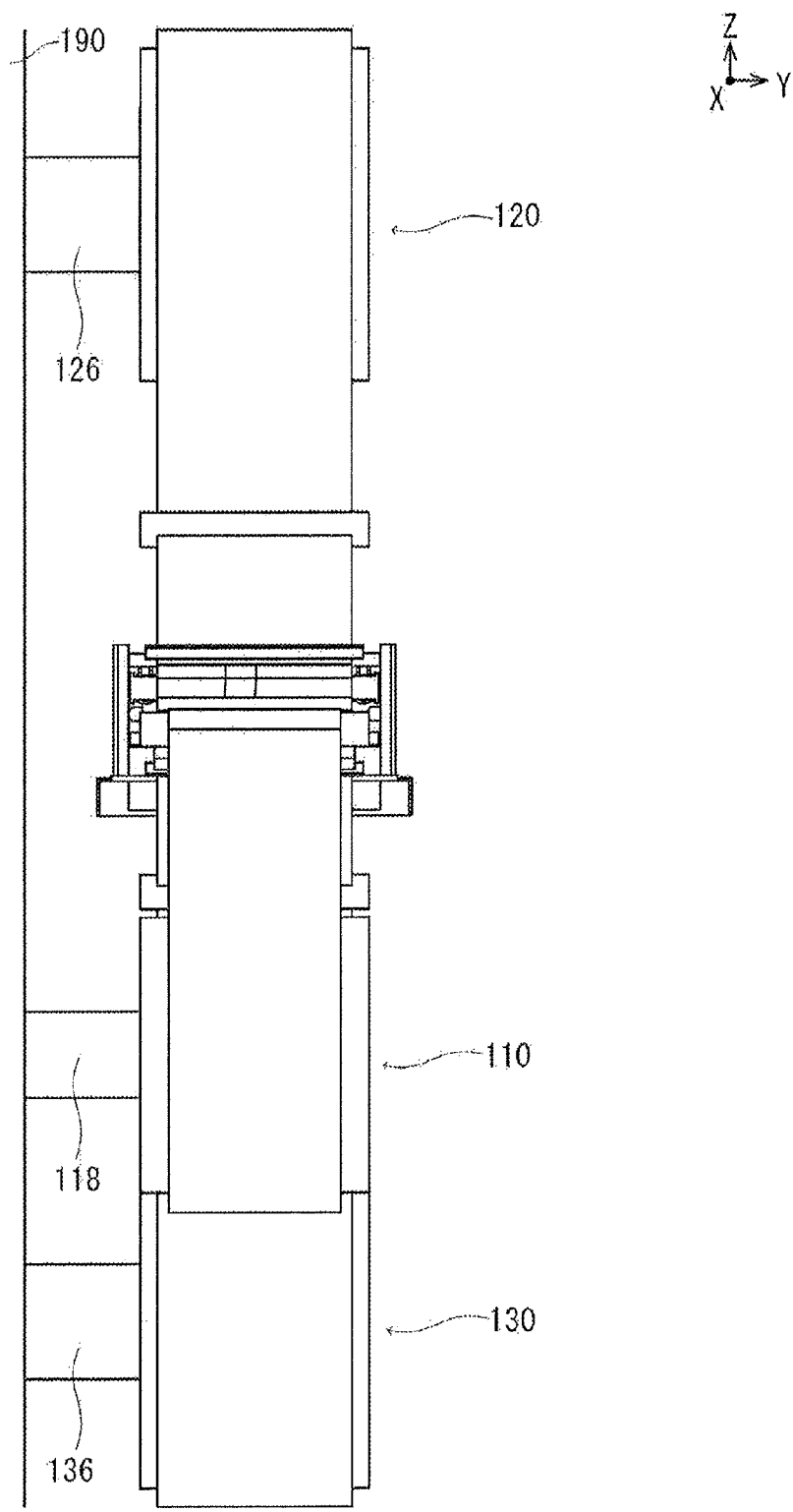
FIG. 5B is a view of the bonding apparatus when viewed from the upstream side of the conveyance direction.
Figure 5C:
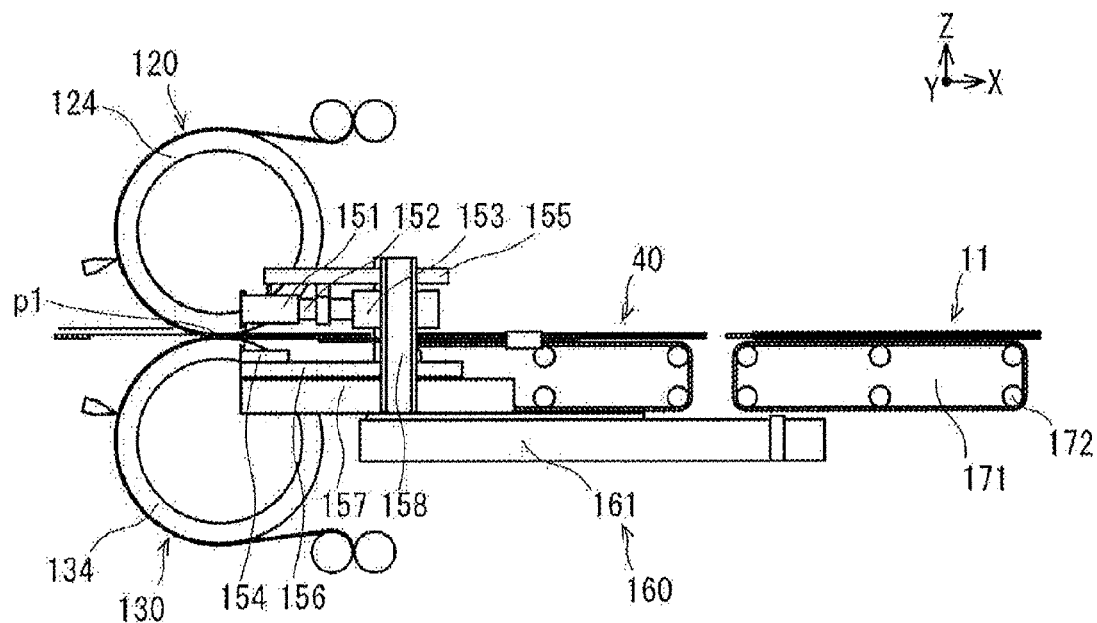
FIG. 5C is a side view illustrating the vicinity of the separator bonding unit in the bonding apparatus.
Figure 6:
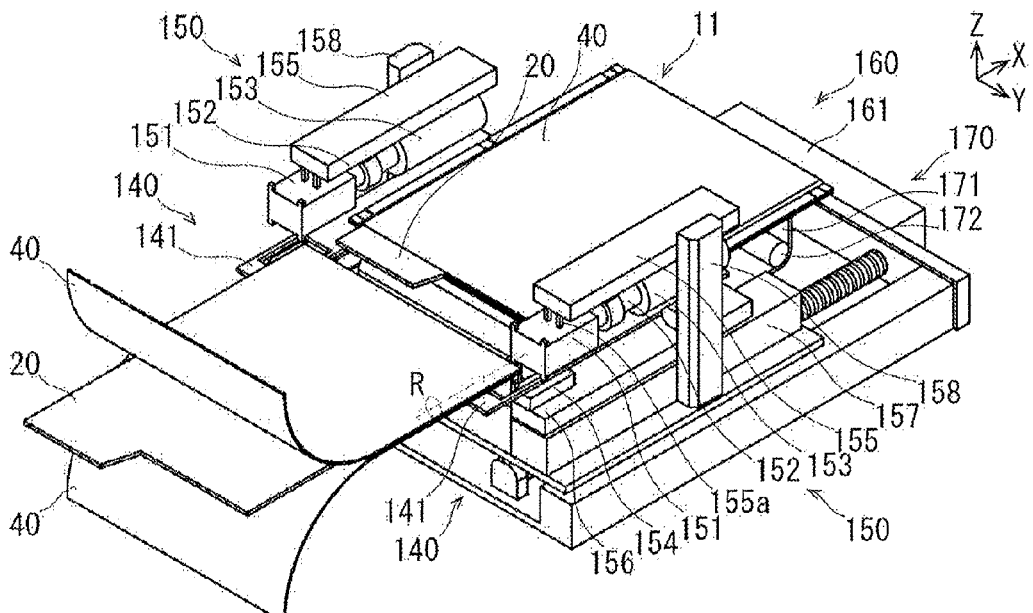
FIG. 6 is a perspective view illustrating the separator holding unit, the separator bonding unit, the separator conveyance following unit, and the bagged electrode conveyance unit of FIG. 5A.
Figure 7:
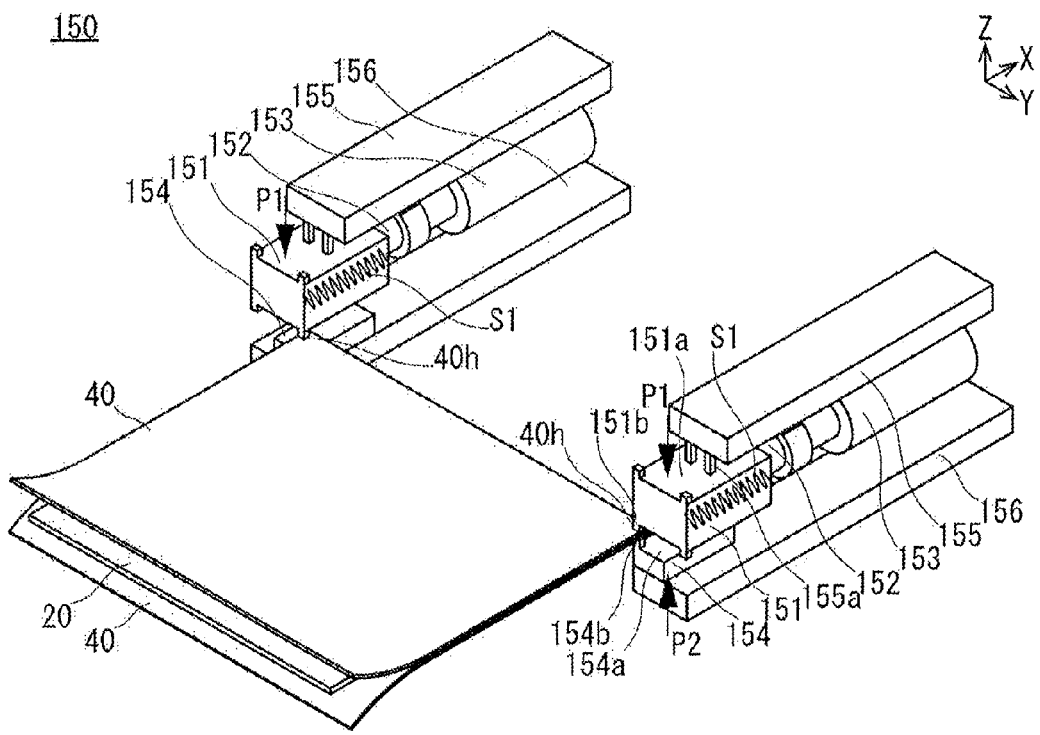
FIG. 7 is a perspective view illustrating the separator bonding unit of FIG. 5A.
Figure 8:
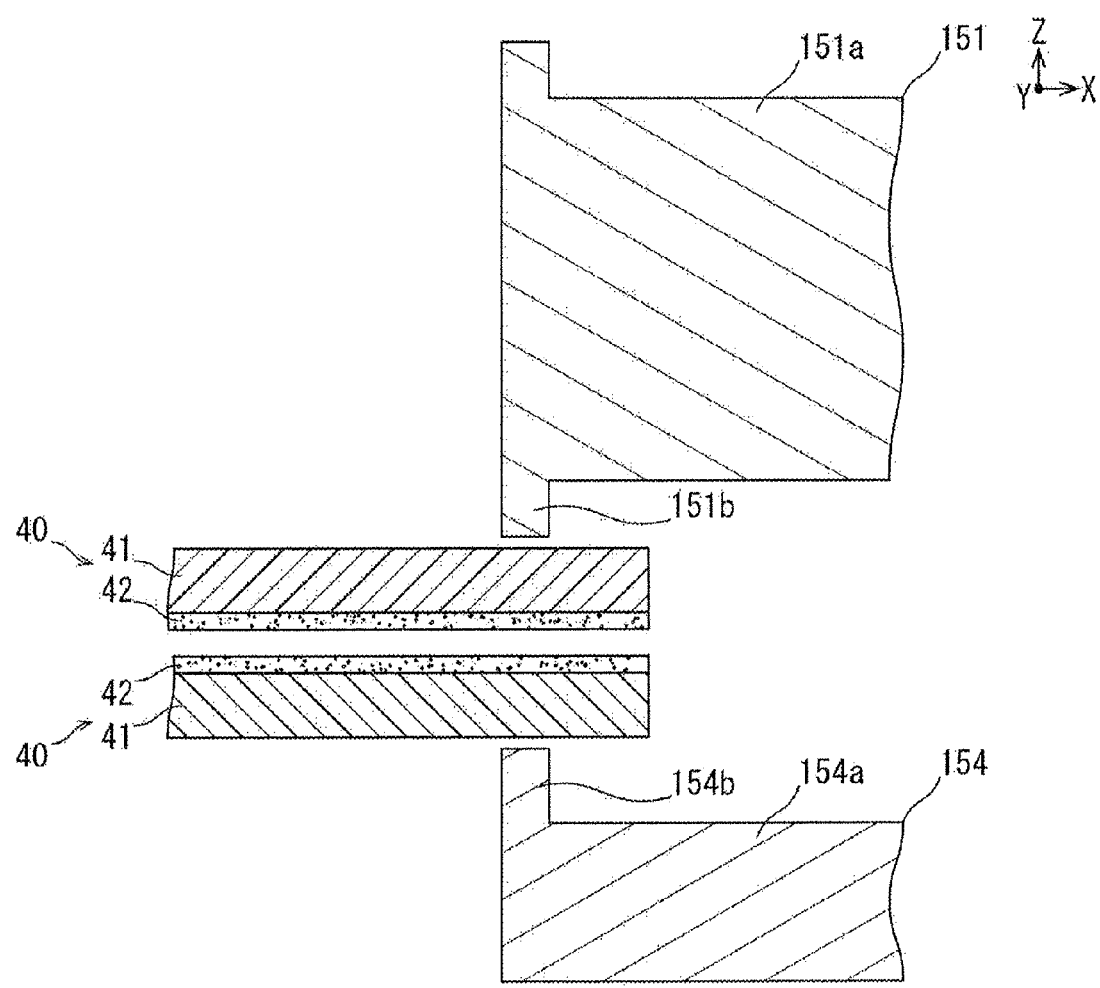
FIG. 8 is a partial cross-sectional view schematically illustrating a state immediately before a pair of ceramic separators are bonded by the separator bonding unit of FIG. 5A.
Figure 9:
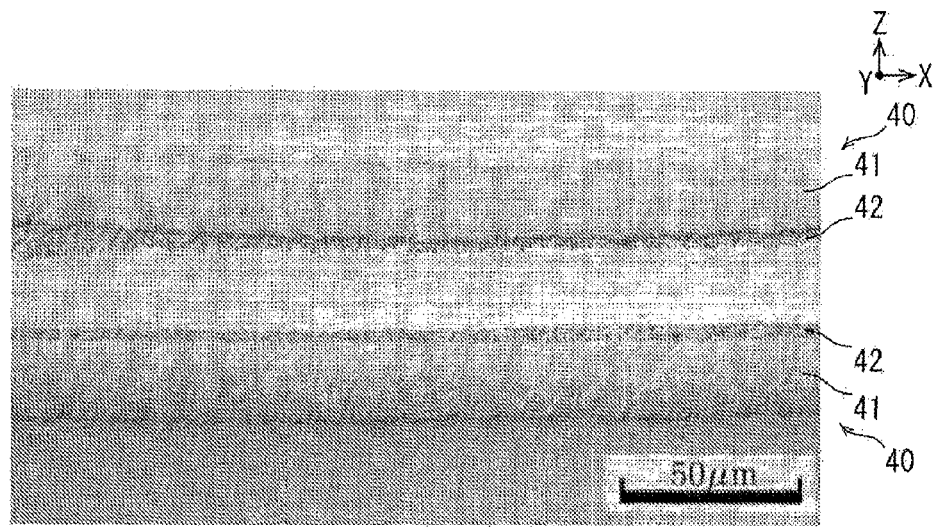
FIG. 9 is a photograph illustrating a pair of ceramic separators in the state of FIG. 8, from the side surface along the conveyance direction.
Figure 10:
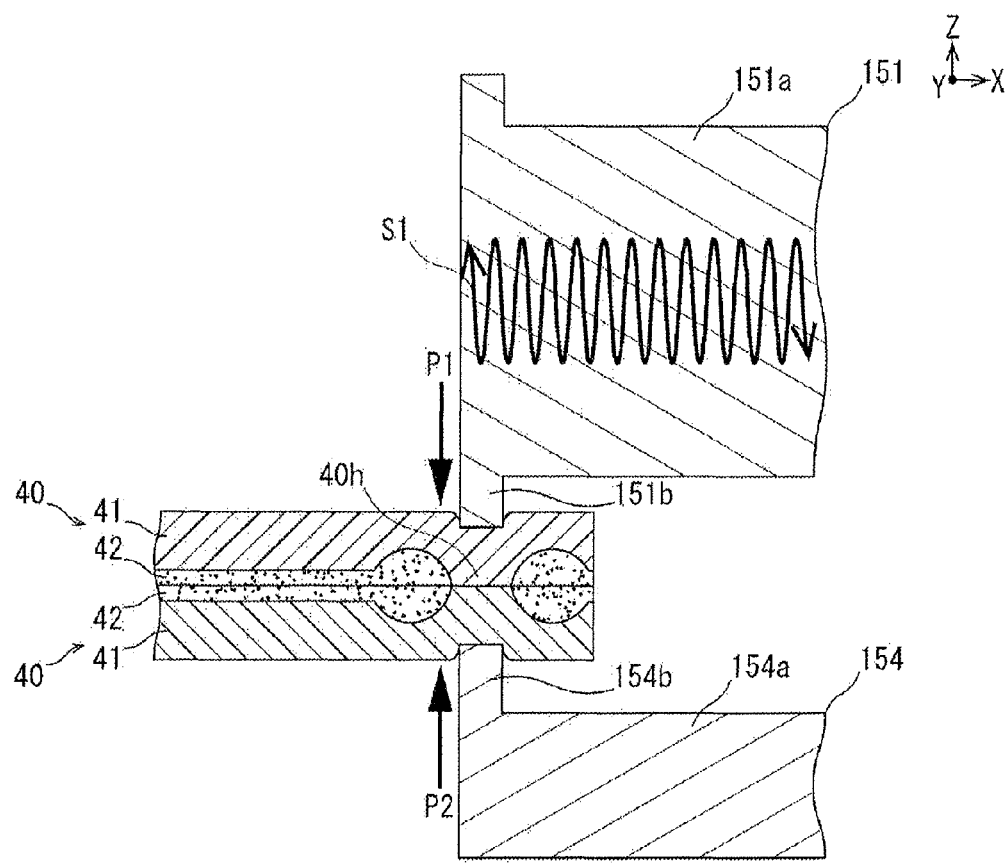
FIG. 10 is a partial cross-sectional view schematically illustrating a state immediately after a pair of ceramic separators are bonded by the separator bonding unit of FIG. 5A.
Figure 11:
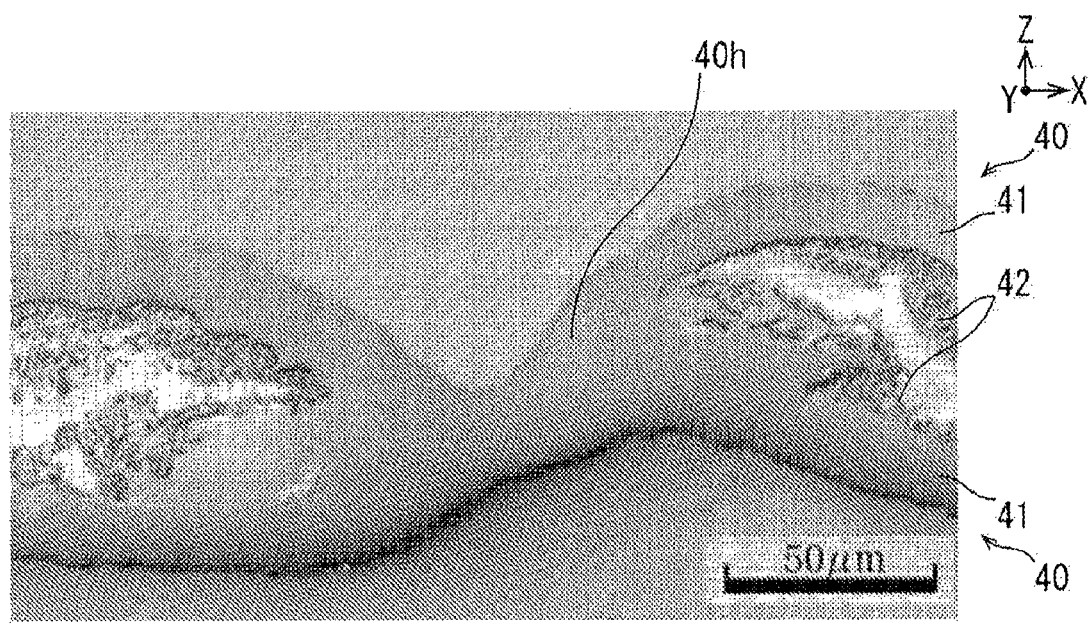
FIG. 11 is a photograph illustrating the pair of ceramic separators in the state of FIG. 10, from the side surface along the conveyance direction.
Figure 12A:
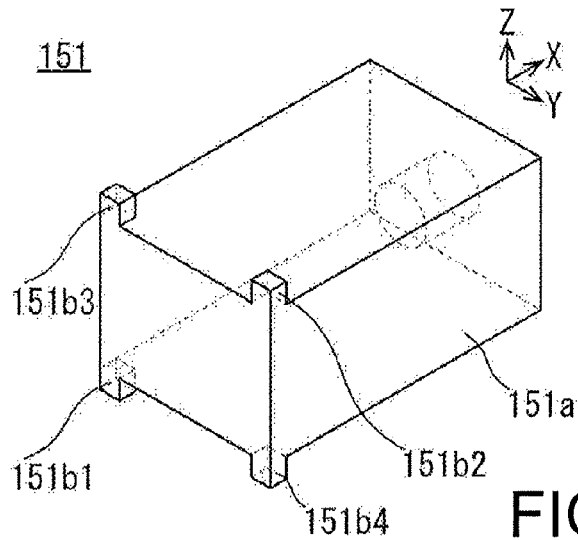
FIGS. 12A-12C are perspective views illustrating the various forms of the horn of the separator bonding unit of FIG. 5A.
Figure 12B:
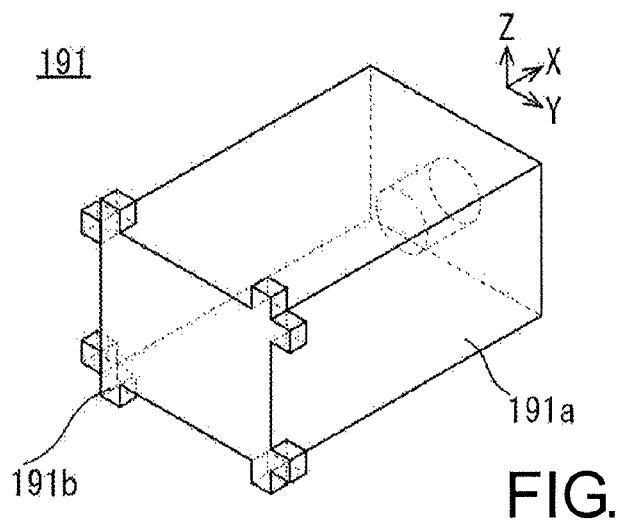
Figure 12C:
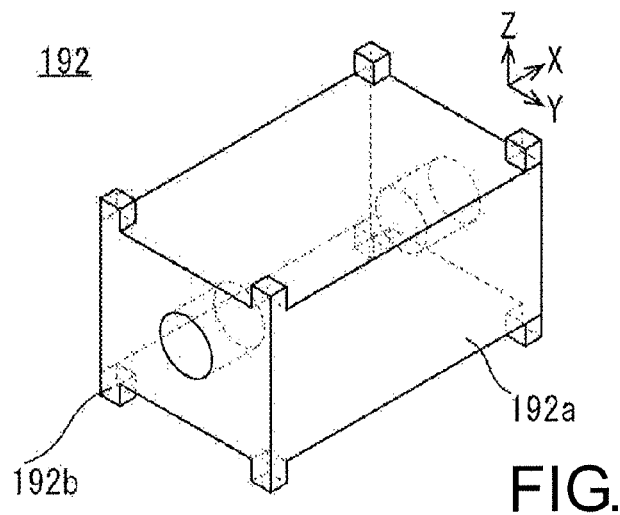

FIG. 5A is a perspective view illustrating the apparatus 100 for bonding separators in electrical devices (bagged electrode 11), FIG. 5B is a view of the bonding apparatus when viewed from the upstream side of the conveyance direction, and FIG. 5C is a side view illustrating the vicinity of the separator bonding unit in the bonding apparatus. FIG. 6 is a perspective view illustrating the separator holding unit 140, the separator bonding unit 150, the separator conveyance following unit 160, and the bagged electrode conveyance unit 170 of FIG. 5A. FIG. 7 is a perspective view illustrating the separator bonding unit 150 of FIG. 5A. FIG. 8 is a partial cross-sectional view schematically illustrating a state immediately before a pair of ceramic separators 40 are bonded by the separator bonding unit 150 of FIG. 5A. FIG. 9 is a photograph illustrating a pair of ceramic separators 40 in the state of FIG. 8, from the side surface along the conveyance direction X. FIG. 10 is a partial cross-sectional view schematically illustrating a state immediately after a pair of ceramic separators 40 are bonded by the separator bonding unit 150 of FIG. 5A. FIG. 11 is a photograph illustrating the pair of ceramic separators 40 in the state of FIG. 10, from the side surface along the conveyance direction X. FIGS. 12A-12C are perspective views illustrating the various forms of the horn of the separator bonding unit 150 of FIG. 5A.

Electrode Conveyance Unit

The electrode conveyance unit 110, illustrated in FIG. 5A and FIG. 5B, cuts out and conveys a positive electrode 20 from an elongated positive electrode substrate 20A.

An electrode feed roller 111 of the electrode conveyance unit 110 has a cylindrical shape, and holds the elongated positive electrode substrate 20A wound thereon. A conveyance roller 112 has an elongated cylindrical shape, and guides the positive electrode substrate 20A wound on the electrode feed roller 111 to a conveyor belt 113 while applying a constant tension thereon. The conveyor belt 113 comprises an endless belt including multiple suction openings on the outer perimeter surface, and conveys the positive electrode substrate 20A under a suctioned state along the conveyance direction X. The width of the conveyor belt 113 along direction Y which intersects the conveyance direction X is longer than the width of the positive electrode substrate 20A. Multiple rotating rollers 114 are arranged on the inner perimeter surface of the conveyor belt 113 along direction Y, which intersects the conveyance direction X, to rotate the conveyor belt 113. Of the multiple rotating rollers 114, one is a drive roller including power, and the others are driven rollers which are driven with the drive roller. The conveyance roller 112 and the electrode feed roller 111 are rotated by being driven by the rotation of the conveyor belt 113.

Cutting blades 115 and 116 of the electrode conveyance unit 110 are arranged so as to be adjacent to each other along the direction Y which intersects the conveyance direction X, and cut the positive electrode substrate 20A into a predetermined shape to form positive electrodes. The cutting blade 115 includes a sharp linear blade at the distal end and cuts one end of the positive electrode substrate 20A in a linear shape along direction Y. The cutting blade 116 includes a sharp blade, a portion of which is bent and formed in a stepped manner, at the distal end, and cuts the other end of the positive electrode substrate 20A immediately after the one end thereof is cut, in accordance with the shape of the positive electrode terminal 21a. A receptacle 117 receives the cutting blade 115 and cutting blade 116, which cut the positive electrode substrate 20A. The receptacle 117 is disposed opposing the cutting blade 115 and cutting blade 116 via the positive electrode substrate 20A to be conveyed. The electrode conveyance unit 110 conveys the positive electrode 20 cut out from the positive electrode substrate 20A so as to pass between the first separator conveyance unit 120 and the second separator conveyance unit 130.

Separator Conveyance Unit

The first separator conveyance unit 120, illustrated in FIG. 5A, FIG. 5B, cuts out and conveys a ceramic separator 40 for laminating on one surface of the positive electrode 20 (upside shown in FIG. 5A along the lamination direction Z) from a ceramic separator substrate 40A.

The first separator conveyance unit 120 is disposed on the downstream side of the electrode conveyance unit 110 in the conveyance direction X and upward along the lamination direction Z shown in FIG. 5A. A first separator feed roller 121 of the first separator conveyance unit 120 has a cylindrical shape and holds an elongated ceramic separator substrate 40A wound thereon. A first pressure roller 122 and a first nip roller 123, which are arranged facing each other, each have an elongated cylindrical shape, and guide the ceramic separator substrate 40A wound on the first separator feed roller 121 to a first conveyance drum 124, while applying a constant tension thereon. The first conveyance drum 124 has a cylindrical shape, and includes multiple suction openings on the outer perimeter surface thereof. The first conveyance drum 124 is configured so that the width along the direction Y which intersects the conveyance direction X is shorter than the width of the ceramic separator substrate 40A. That is, the two ends of the ceramic separator substrate 40A protrude outwardly from the first conveyance drum 124, with respect to direction Y. In this manner, the first conveyance drum 124 avoids interference with the separator holding unit 140 and the separator bonding unit 150.

When the first conveyance drum 124 of the first separator conveyance unit 120 is rotated, the first separator feed roller 121 is driven and rotated, in addition to the first pressure roller 122 and the first nip roller 123. A first cutting blade 125 includes a sharp linear blade at the distal end, arranged along the direction Y which intersects the conveyance direction X, and cuts the elongated ceramic separator substrate 40A which is being suctioned by the first conveyance drum 124 at a constant width. The first conveyance drum 124 causes a ceramic separator 40 that has been cut in a rectangular shape to approach and laminate on one surface side of a positive electrode 20 that has been conveyed from the electrode conveyance unit 110. The ceramic layer 42 side of the ceramic separator 40 is opposed to one surface of the positive electrode 20.

The second separator conveyance unit 130, illustrated in FIG. 5A, cuts out and conveys a separator 40 for laminating on the other surface facing the one surface of the positive electrode 20 (downside shown in FIG. 5A along the lamination direction Z) from the ceramic separator substrate 40A.

The second separator conveyance unit 130 is disposed on the downstream side of the electrode conveyance unit 110 in the conveyance direction X and downward along the lamination direction Z shown in FIG. 5A. The second separator conveyance unit 130 is disposed opposing the first separator conveyance unit 120 along the lamination direction Z. A second separator feed roller 131 of the second separator conveyance unit 130 has a cylindrical shape and holds an elongated ceramic separator substrate 40A wound thereon. A second pressure roller 132 and a second nip roller 133, which are arranged facing each other, each have an elongated cylindrical shape, and guide the ceramic separator substrate 40A wound on the second separator feed roller 131 to a second conveyance drum 134, while applying a constant tension thereon. The second conveyance drum 134 has a cylindrical shape, and includes multiple suction openings on the outer perimeter surface thereof. The second conveyance drum 134 is configured so that the width along the direction Y which intersects the conveyance direction X is shorter than the width of the ceramic separator substrate 40A in the same way as the first conveyance drum 124, to avoid interference with the separator holding unit 140 and the separator bonding unit 150.

When the second conveyance drum 134 of the second separator conveyance unit 130 is rotated, the second separator feed roller 131 is driven and rotated, in addition to the second pressure roller 132 and the second nip roller 133. A second cutting blade 135 includes a sharp linear blade at the distal end, arranged along the direction Y which intersects the conveyance direction X, and cuts the elongated ceramic separator 40 which is being suctioned by the second conveyance drum 134 at a constant width. The second conveyance drum 134 causes the ceramic separator substrate 40A that has been cut in a rectangular shape to approach and laminate on the other surface side of a positive electrode 20 that has been conveyed from the electrode conveyance unit 110. The ceramic layer 42 side of the ceramic separator 40 is opposed to the other surface of the positive electrode 20.

The first separator conveyance unit 120 and the second separator conveyance unit 130 laminate a pair of ceramic separators 40 so as to sandwich the positive electrode 20 in the gap portion between the first conveyance drum 124 and the second conveyance drum 134 while conveying the same along the conveyance direction X. The conveyance direction X is a direction in which a pair of separators 40 are overlapped and conveyed to a position in which the separators 40 are bonded by a horn 151 of the separator bonding unit 150 described below, as illustrated in FIG. 5C and the like. On both ends on the downstream side along the conveyance direction X thereof is respectively arranged the separator holding unit 140 and the separator bonding unit 150. Reference codes 118, 126, and 136 are support members that rotatably support the electrode feed roller 111, the first separator feed roller 121, and the second separator feed roller 131, which protrude from a wall surface 190. In addition, support members 118, 126, 136 are each connected to a power mechanism, which is not shown, in the wall surface 190. In the present embodiment, support members 118, 126, and 136 support the electrode feed roller 111, the first separator feed roller 121, and the second separator feed roller 131 in a cantilever state, but a structure that supports the shaft of each roller from both sides may be employed as well.

Separator Holding Unit

The separator holding unit 140, illustrated in FIG. 5A and FIG. 6, holds the pair of ceramic separators 40 which are laminated so as to sandwich the positive electrode 20.

The separator holding unit 140 is adjacent to the electrode conveyance unit 110 along the conveyance direction X, and is disposed on the downstream side of the first separator conveyance unit 120 and the second separator conveyance unit 130 in the conveyance direction X. A pair of separator holding units 140 are arranged on each of the two ends of the bagged electrode conveyance unit 170 along the conveyance direction X. A holding plate 141 of the separator holding unit 140 is formed in an elongated plate shape. The holding plate 141 is disposed further downward as shown in FIG. 6 than the ceramic separator 40 in the lamination direction Z, and parallel to the end of the ceramic separator 40 along the conveyance direction X. By holding the pair of ceramic separators 40 from downward as shown in FIG. 6 in the lamination direction Z, the holding plate 141 assists the bonding of the ceramic separators 40 to each other by the separator bonding unit 150. The holding plate 141 includes rectangular holes in order to prevent interference with an anvil 154 as well as the horn 151 of the separator bonding unit 150.

The holding plate 141 of the separator holding unit 140 is raised and lowered along the lamination direction Z by a drive strut 158 of the separator bonding unit 150. The holding plate 141 holds the pair of ceramic separators 40 from downward as shown in FIG. 6 in the lamination direction Z while the horn 151 and the anvil 154 are abutted so as to sandwich the pair of ceramic separators 40. On the other hand, the holding plate 141 is retracted downward as shown in FIG. 6 in the lamination direction Z while the horn 151 and the anvil 154 are separated from the pair of ceramic separators 40.

Separator Bonding Unit

The separator bonding unit 150, related to FIG. 5A thru FIGS. 12A-12C, bonds ceramic separators 40 that are laminated so as to sandwich a positive electrode 20 to each other by heating with frictional heat that is generated by ultrasound.

First, the configuration of the separator bonding unit 150 will be described, with reference to FIG. 5A thru FIG. 7.

The separator bonding unit 150 is disposed on the downstream side of the first separator conveyance unit 120 and the second separator conveyance unit 130 in the conveyance direction X. A pair of separator bonding units 150 are arranged on each of the two ends along the conveyance direction X. The separator bonding unit 150 is proximate to the separator holding unit 140.

The horn 151 (corresponding to the abutting part) of the separator bonding unit 150 applies ultrasound to the ceramic separator 40. The horn 151 is made of metal, integrally forming a rectangular main body portion 151a and protrusions 151b (corresponding to the contact portion) formed protruding from the corners of the main body portion 151a. In the present embodiment, four protrusions 151b are formed on the horn 151b, but no limitation is imposed thereby. The horn 151 is pressed by a pressing member 155, as indicated by the arrow P1 in FIG. 7, and the protrusion 151b is abutted with the polypropylene layer 41 of the ceramic separator 40. The horn 151 generates frictional heat for heating the bonding surface between the ceramic layers 42 by applying ultrasound therealong, which intersects the lamination direction Z, as indicated by the wavy line S1 in FIG. 7.

A booster 152 (corresponding to the amplifier unit) of the separator bonding unit 150 amplifies the ultrasound while fastening the horn 151 and an oscillator 153 (corresponding to the transmission unit). The booster 152 is made of metal and formed in a cylindrical shape. The oscillator 153 generates oscillations corresponding to the frequency of the ultrasound by power supplied from the outside. One end of the oscillator 153 is fastened to the booster 152, and the other end opposing the one end is connected to a power cable. The anvil 154 corresponds to the abutting member, and biases the horn 151 while receiving ultrasonic oscillations that are emitted from the horn 151. The anvil 154 is made of metal, integrally forming a rectangular main body portion 154a and a protrusion 154b formed protruding from one end of the main body portion 154a. The protrusion 154b of the anvil 154 is opposed with the protrusions 151b of the horn 151 via a pair of ceramic separators 40. The anvil 154 is pressed by a biasing member 156 and biases the horn 151, as indicated by the arrow P2 in FIG. 7.

The pressing member 155 (corresponding to the holding portion) of the separator bonding unit 150 presses the horn 151 downward as shown in FIG. 7 along the lamination direction Z. The pressing member 155, one end of which is formed in an annular shape and to which is inserted the booster 152 fastened to the horn 151, rotatably holds the horn 151, the booster 152, and the oscillator 153. The horn 151 and the booster 152 illustrated on the front side and the horn 151 and the booster 152 illustrated on the rear side in FIG. 7 are fastened with screws, and the rotational direction R in which the screws of the horn 151 and the booster 152 on the front side and on the rear side is configured to be the same direction. The sides of the pressing member 155 are coupled to the drive strut 158 so as to be movable along the lamination direction Z. In addition, the pressing member 155 comprises an abutting member 155a which is capable of switching between contact and non-contact with the horn 151. The abutting member 155a is configured to be capable of protruding from and receding to a plate-like surface of the pressing member 155 along the lamination direction Z, thereby switching between contact and non-contact with the horn 151. The biasing member 156 presses the anvil 154 upward as shown in FIG. 7 along the lamination direction Z. The biasing member 156 is formed in a plate shape, and the anvil 154 is bonded to the end portion thereof. The biasing member 156 is coupled to the drive strut 158 so as to be movable along the lamination direction Z.

A drive stage 157 of the separator bonding unit 150 moves the pressing member 155 and the biasing member 156 along the lamination direction Z, via the drive strut 158. The driving force generated by the drive stage 157 is used by converting to a drive force along the lamination direction Z with the drive strut 158.

In the separator bonding unit 150, the horn 151, the booster 152, and the oscillator 153 are laid out in a plane that is parallel to the direction in which the separators are conveyed and perpendicular to the surfaces of the ceramic separators 40. In the present embodiment, the horn 151, the booster 152, and the oscillator 153 are positioned upward as shown in FIG. 7 with respect to the separator holding unit 140, and arranged along the conveyance direction X. The pressing member 155 is disposed side by side with the horn 151, the booster 152, and the oscillator 153 along the lamination direction Z. The anvil 154 and the biasing member 156 are arranged side by side downward as shown in FIG. 7 along the lamination direction Z with respect to the separator holding unit 140. The drive stage 157 is disposed directly below as shown in FIG. 7 along the lamination direction Z, in the same way as the biasing member 156 to which is mounted the anvil 154, and disposed along the conveyance direction X. In this manner, the horn 151, the booster 152, and the oscillator 153 which configure the separator bonding unit 150 are arranged along the conveyance direction X, and the anvil 154, the pressing member 155, the biasing member 156, the drive stage 157, and the drive strut 158 are arranged along the lamination direction Z, with the exception of the drive strut 158. Since the bonding apparatus 100 is an equipment that accompanies an assembly line, it is difficult to avoid the dimension of the equipment in the conveyance direction of the assembly line from becoming large. However, there is little need to place the equipment in the axial direction of the support member 118 that supports the electrode feed roller 111 and the like. Accordingly, the component members of the ultrasonic bonding unit 150, which carries out ultrasonic bonding, are able to keep the amount of space taken up by the equipment as a whole small while establishing the layout of the component members, by being arranged along the conveyance direction X of the electrode conveyance unit 110 and the lamination direction Z of the electrodes.

Figure 5D:
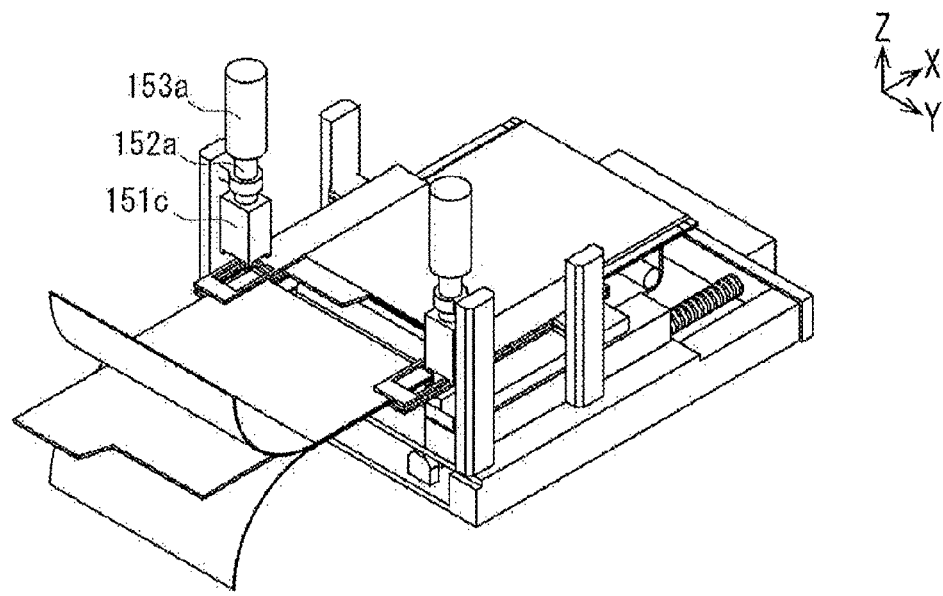
FIG. 5D is a perspective view illustrating a modified example of the separator bonding unit in the bonding apparatus.
Figure 5E:
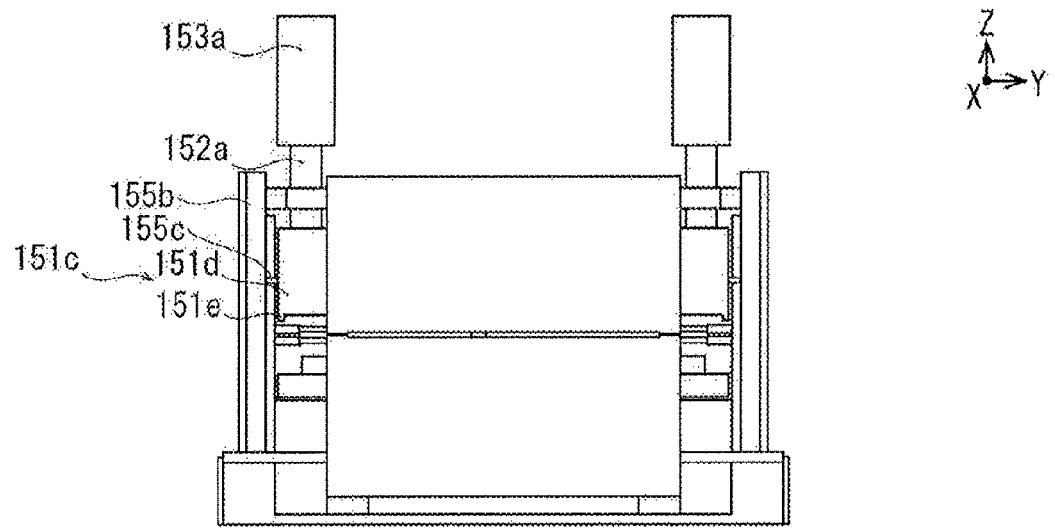
FIG. 5E is a front view of FIG. 5D.
Figure 5F:
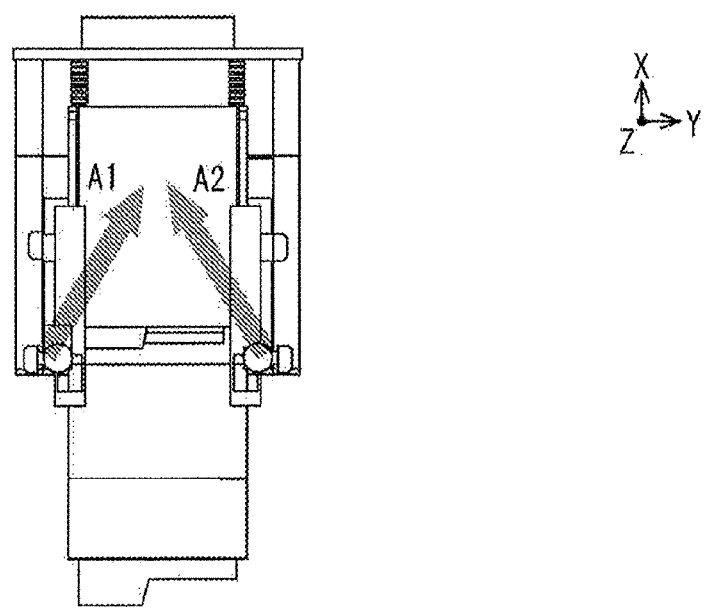
FIG. 5F is a plan view of FIG. 5D.

FIG. 5D is a perspective view illustrating a modified example of the separator bonding unit in the apparatus for bonding separators in electrical devices according to the present embodiment, FIG. 5E is a front view of FIG. 5D, and FIG. 5F is a plan view of FIG. 5D. The horn 151, the booster 152, and the oscillator 153 are described above as being arranged along the conveyance direction X; however, from the point of view of making the equipment less likely to take up space, an arrangement along the lamination direction Z as illustrated in FIG. 5D may also be employed. In FIG. 5D and FIG. 5E, the retaining member 155$b$ rotatably supports the horn 151$c$, the booster 152$a$, and the oscillator 153$a$ around an axis that is parallel to the lamination direction Z. An abutting member 155$c$, which freely protrudes and retracts toward and from the main body portion 151$d$ of the horn 151$c$, is disposed on the retaining member 155$b$. The protrusions 151$e$ of the horn 151$c$ are formed downward in the lamination direction Z.

The XZ plane which is formed by the conveyance direction X in which the horn 151, the booster 152, and the oscillator 153 are arranged, and the lamination direction Z in which the horn 151$c$, the booster 152$a$, and the oscillator 153$a$ are arranged, is a plane that is orthogonal to the surface of the separator 40 (XY plane), as described above, and corresponds to the surface along the direction in which the separators 40 are conveyed. By arranging the horn 151$c$, the booster 152$a$, and the oscillator 153$a$ side by side on the XZ plane as described above, the amount of space taken up by the equipment can be kept small.

In addition, other than arranging the horn 151$c$, the booster 152$a$, and the oscillator 153$a$ on the XZ plane, the booster 152$a$ and the oscillator 153$a$ may be arranged side by side on a surface that is inclined inward in the direction in which the separators 40 are conveyed in reference to the horn 151$c$. In other words, on a surface that is orthogonal to the surface of the separators 40 and that is inclined inward in reference to the horn 151$c$, as illustrated by arrows A1, A2 in FIG. 5F, in order to keep the amount of space taken up by the equipment small.

Next, the action of the separator bonding unit 150 will be described, with reference to FIG. 8 thru FIG. 11.

The state immediately before a pair of ceramic separators 40 are bonded by the separator bonding unit 150 is illustrated in FIG. 8 and FIG. 9. In a ceramic separator 40 formed by laminating a polypropylene layer 41 and a ceramic layer 42, the ceramic layers 42 are opposed to each other as illustrated in FIG. 9.

The state immediately after the pair of ceramic separators 40 are bonded by the separator bonding unit 150 is illustrated in FIG. 10 and FIG. 11. The horn 151 abuts the polypropylene layer 41 of one ceramic separator 40 of a pair of ceramic separators 40, and applies ultrasound along the bonding surface between the ceramic layers 42, which intersects the lamination direction Z, as indicated by the wavy line S1 in FIG. 10. The direction of the wavy line S1 corresponds to the conveyance direction X, which intersects the lamination direction Z. At the same time, the pressing member 155 presses the horn 151 toward the polypropylene layer 41 of the ceramic separator 40, as indicated by arrow P1 in FIG. 10. In addition, the biasing member 156 presses the anvil 154 toward the horn 151, as indicated by arrow P2 in FIG. 10. By causing such actions, the polypropylene layers 41 of the pair of ceramic separators 40 are heated and melted as illustrated in FIG. 11, and the ceramic layers 42 are moved from the bonding portion 40$h$ to the peripheral region and made coarse; thus, the opposed polypropylene layers 41 can be bonded to each other. Next, the operation of the separator bonding unit 150 and the various configurations of the horn are described, with reference to FIGS. 12A-12C.

The above-described horn 151 is illustrated in FIG. 12A. Since ultrasound is applied by the oscillator 153, the portion of the horn 151 that opposes the anvil 154 is deteriorated. Therefore, if the protrusion 151$b$1, which is formed in one corner of one side surface of the main body portion 151$a$, is deteriorated, first, the abutting member 155$a$ of the pressing member 155 is transitioned from a state of being in contact with the side surface of the horn 151 to a non-contact state, the main body portion 151$a$ is rotated 180° with the conveyance direction X as the rotational axis (refer to the reference code R in FIG. 6), and the protrusion 151$b$2 which opposes the protrusion 151$b$1 is used. Next, if the protrusion 151$b$2 is deteriorated, the horns 151 which are each arranged opposing each other along direction Y via the bagged electrode conveyance unit 170 are replaced so as to move in parallel along direction Y, and the protrusion 151$b$3 of the replaced horn 151 is used. Furthermore, if the protrusion 151$b$3 is deteriorated, the abutting member 155$a$ and the horn 151 are put in a non-contact state, the main body portion 151$a$ is rotated 180° with the conveyance direction X as the rotational axis, and the protrusion 151$b$4 which opposes the protrusion 151$b$3 is used. In this manner, by forming one protrusion 151$b$ on each of the four corners of one end of the main body portion 151$a$, the longevity of the horn 151 can be extended four-fold. In addition, by rotating the booster 152 and the horn 151 which includes the oscillator 153, the diagonal positions of the protrusions 151$b$1 thru 151$b$4, which carry out the bonding between the separators, can be easily replaced. In addition, by switching between contact and non-contact with the horn 151 by the abutting member 155$a$ of the pressing member 155, the protrusion 151b1 thru 151b4 to be used can be easily switched. Additionally, by using the same type of screw for the screws used for fastening the horns 151 and the boosters 152 on the front side and the rear side in FIG. 7, the horns 151 on the front side and the rear side can be shared, allowing a reduction in costs.

A horn 191 according to a first modified example of the horn 151 is illustrated in FIG. 12B. The horn 191 integrally forms two protrusions 191b which are adjacent in a state of being perpendicular to each other on each of the four corners on one side of the main body portion 191a. Therefore, by using a different protrusion 191b each time a protrusion 191b is deteriorated, the longevity of the horn 191 can be extended to twice the longevity of the horn 151.

A horn 192 according to a second modified example of the horn 151 is illustrated in FIG. 12C. The horn 192 integrally forms one protrusion 192b on each of the four corners on one side as well as the four corners on the other side of the main body portion 192a. Therefore, by using a different protrusion 192b each time a protrusion 192b is deteriorated, the longevity of the horn 192 can be extended to about the same as the longevity of the horn 191. Here, since the anvil 154 receives the ultrasonic oscillations that are emitted from the horn 151 via the pair of ceramic separators 40, the anvil is deteriorated in the same way as the horn 151. Therefore, the multiple protrusions 154b are integrally formed on the main body portion 154a of the anvil 154, in the same way as the horn 151.

Separator Conveyance Following Unit

The separator conveyance following unit 160, illustrated in FIG. 5A and FIG. 6, moves the separator bonding unit 150 and the like, following the conveyance of the bagged electrode conveyance unit 170, while the separator bonding unit 150 is bonding the ceramic separators 40 to each other.

The separator conveyance following unit 160 is disposed on the downstream side of the first separator conveyance unit 120 and the second separator conveyance unit 130 in the conveyance direction X, and further downward as shown in FIG. 5A than the bagged electrode conveyance unit 170 along the lamination direction Z. An x-axis stage 161 of the separator conveyance following unit 160 is mounted with all the component members of the separator holding unit 140 and all the component members of the separator bonding unit 150. The x-axis stage 161 is moved so as to reciprocate between the downstream side and the upstream side of the conveyance direction X. The x-axis stage 161 is moved along the downstream side of the conveyance direction X while the horn 151 and the anvil 154 are abutting and bonding the pair of ceramic separators 40. On the other hand, the x-axis stage 161 moves along the upstream side of the conveyance direction X at a high speed and returns to the original position, when the horn 151 and the anvil 154 complete the bonding of the pair of ceramic separators 40 and are separated.

As the separator holding unit 140 and the separator bonding unit 150 are moved along the conveyance direction X by the separator conveyance following unit 160, the operations of the first separator conveyance unit 120 and the second separator conveyance unit 130 can be continued while the pair of ceramic separators 40 are being bonded. That is, by using the x-axis stage 161, the bonding of the pair of ceramic separators 40 can be completed without stopping the rotations of the first conveyance drum 124 of the first separator conveyance unit 120 and the second conveyance drum 134 of the second separator conveyance unit 130.

Bagged Electrode Conveyance Unit

The bagged electrode conveyance unit 170, illustrated in FIG. 5A and FIG. 6, conveys the bagged electrode 11 that is formed by the separator bonding unit 150.

The bagged electrode conveyance unit 170 is adjacent to the electrode conveyance unit 110 along the conveyance direction X, and is disposed on the downstream side of the first separator conveyance unit 120 and the second separator conveyance unit 130 in the conveyance direction X. A conveyor belt 171 of the bagged electrode conveyance unit 170 comprises an endless belt including multiple suction openings on the outer perimeter surface, and conveys the bagged electrode 11 under a suctioned state along the conveyance direction X. The width of the conveyor belt 171 along direction Y which intersects the conveyance direction X is formed shorter than the width of the bagged electrode 11. That is, the two ends of the bagged electrode 11 protrude outwardly from the conveyor belt 171, with respect to direction Y. In this manner, the conveyor belt 171 avoids interference with the separator holding unit 140 and the separator bonding unit 150.

Multiple rotating rollers 172 of the bagged electrode conveyance unit 170 are arranged on the inner perimeter surface of the conveyor belt 171 along direction Y, which intersects the conveyance direction X, to rotate the conveyor belt 171. The rotating roller 172 is not protruded from the conveyor belt 171 in order to avoid interference with the separator holding unit 140 and the separator bonding unit 150. Of the multiple rotating rollers 172, one is a drive roller including power, and the others are driven rollers which are driven with the drive roller. For example, three sets of the conveyor belts 171 are disposed along the conveyance direction X.

A suction pad 173 of the bagged electrode conveyance unit 170 is positioned so as to oppose the bagged electrode 11, further upward as shown in FIG. 5A than the bagged electrode 11, which is mounted on the conveyor belt 171, in the lamination direction Z. The suction pad 173 has a plate shape, and includes multiple suction openings on the surface that abuts the bagged electrode 11. An elastic member 174 is positioned further upward as shown in FIG. 5A than the suction pad 173 in the lamination direction Z. One end of the elastic member 174 bonded to the suction pad. The elastic member 174 can be freely extended along the lamination direction Z, powered by an air compressor or the like.

An x-axis stage 175 and an x-axis auxiliary rail 176 of the bagged electrode conveyance unit 170 movably support the other end of the elastic member 174 opposing the one end thereof. The x-axis stage 175 is disposed along the conveyance direction X, and scans the elastic member 174 along the conveyance direction X. The x-axis auxiliary rail 176 is disposed parallel to the x-axis stage 175, and assists the scanning of the elastic member 174 by the x-axis stage 175. A mounting table 177 has a plate shape, and is disposed, for example, further on the downstream side than the three sets of arranged conveyor belts 171 along the conveyance direction X. The mounting table 177 temporarily mounts and stores the bagged electrode 11.

Control Unit

The control unit 180, illustrated in FIG. 5A, controls the respective operations of the electrode conveyance unit 110, the first separator conveyance unit 120, the second separator conveyance unit 130, the separator holding unit 140, the separator bonding unit 150, the separator conveyance following unit 160, and the bagged electrode conveyance unit 170.

A controller 181 of the control unit 180 comprises ROM, CPU, and RAM. The ROM (Read Only Memory) stores a control program relating to the apparatus 100 for bonding separators. The control program includes those related to the controls of the rotating roller 114 and the cutting blades 115 and 116 of the electrode conveyance unit 110, the first conveyance drum 124 and the first cutting blade 125 of the first separator conveyance unit 120, and the second conveyance drum 134 and the second cutting blade 135 of the second separator conveyance unit 130. Furthermore, the control program includes those related to the controls of the holding plate 141 of the separator holding unit 140, the oscillator 153 and the drive stage 157 of the separator bonding unit 150, the x-axis stage 161 of the separator conveyance following unit 160, and the rotating roller 172 and the elastic member 174 of the bagged electrode conveyance unit 170, and the like.

The CPU (Central Processing Unit) of the control unit 180 controls the operation of each component member of the apparatus 100 for bonding separators based on the control program. The RAM (Random Access Memory) temporarily stores various data relating to each component member of the apparatus 100 for bonding separators being controlled. Data are, for example, related to the timing of the operation of the oscillator 153 of the separator bonding unit 150.

Bonding of the Separators

Next, the action of the apparatus 100 for bonding separators will be described.

The electrode conveyance unit 110 cuts the elongated positive electrode substrate 20A one by one into a predetermined shape to form positive electrodes 20 with the cutting blades 115 and 116, as illustrated in FIG. 5A. The electrode conveyance unit 110 conveys the positive electrode 20 between the first separator conveyance unit 120 and the second separator conveyance unit 130.

Next, the first separator conveyance unit 120 cuts out and conveys a ceramic separator 40 for laminating on one surface of the positive electrode 20 from the ceramic separator substrate 40A, as illustrated in FIG. 5A. The elongated ceramic separator substrate 40A is cut with the first cutting blade 125 to a rectangular shape one by one to form ceramic separators 40. The first separator conveyance unit 120 laminates the ceramic separator 40 onto one surface side of the positive electrode 20 that is conveyed from the electrode conveyance unit 110.

Next, the second separator conveyance unit 130 cuts out and conveys a ceramic separator 40 for laminating on the other surface facing the one surface of the positive electrode 20 from the ceramic separator substrate 40A, as illustrated in FIG. 5A. The elongated ceramic separator substrate 40A is cut with the second cutting blade 135 to a rectangular shape one by one to form ceramic separators 40. The second separator conveyance unit 130 laminates the ceramic separator 40 onto the other surface side of the positive electrode 20 that is conveyed from the electrode conveyance unit 110.

Next, the separator holding unit 140 holds the pair of ceramic separators 40 which are laminated on the electrode 20, as illustrated in FIG. 5A and FIG. 6. By holding the pair of ceramic separators 40 from downward as shown in FIG. 6 in the lamination direction Z, the holding plate 141 assists the bonding of the ceramic separators 40 to each other by the separator bonding unit 150. That is, the holding plate 141 holds one of the pair of ceramic separators 40 positioned below from downward as shown in FIG. 5A in the lamination direction Z while the horn 151 and the anvil 154 are abutted to the pair of ceramic separators 40.

Next, the separator bonding unit 150 bonds the ceramic separators 40 which are laminated so as to sandwich the positive electrode 20 to each other, as illustrated in FIG. 10 and FIG. 11. The horn 151 abuts the polypropylene layer 41 of the ceramic separator 40, and applies ultrasound along the bonding surface between the ceramic layers 42, which intersects the lamination direction Z, as indicated by the wavy line S1 in the drawing. The direction of the wavy line S1 corresponds to the conveyance direction X, which intersects the lamination direction Z. The pressing member 155 presses the horn 151 toward the polypropylene layer 41 of the ceramic separator 40 along the lamination direction Z, as indicated by arrow P1 in the drawing. The anvil 154 applies pressure toward the horn 151 as indicated by arrow P2 in the drawing. In this manner, the polypropylene layers 41 of the pair of ceramic separators 40 are heated and melted as illustrated in FIG. 11, and the ceramic layers 42 are moved from the bonding portion 40h to the peripheral region and made coarse; thus, the polypropylene layers 41 are bonded to each other. Therefore, the ceramic separators 40 can be bonded to each other from a state in which the ceramic layers 42, which are difficult to melt, are facing each other.

Here, the separator conveyance following unit 160 follows the conveyance operation of the bagged electrode conveyance unit 170, while the separator bonding unit 150 is bonding the ceramic separators 40 to each other, as illustrated in FIG. 5A and FIG. 6. The x-axis stage 161 is mounted with all the component members of the separator holding unit 140 and all the component members of the separator bonding unit 150. The x-axis stage 161 is moved along the downstream side of the conveyance direction X while the horn 151 and the anvil 154 are abutting and bonding the pair of ceramic separators 40. That is, by using the x-axis stage 161, the pair of ceramic separators 40 can be bonded without stopping the rotations of the first conveyance drum 124 and the second conveyance drum 134.

Then, the bagged electrode conveyance unit 170 conveys the bagged electrode 11 that is formed by the separator bonding unit 150, as illustrated in FIG. 5A and FIG. 6. The bagged electrode conveyance unit 170 temporarily mounts and stores the bagged electrode 11 on the mounting table 177.

Action and Effects

According to the first embodiment described above, the action and effects are achieved by the following configurations.

When performing bonding using ultrasound to bond the components of electrical devices such as a secondary battery, bonding between members that are thin like foil, having high temperature characteristics can be achieved; however, units that use ultrasound have complex structures, such as an oscillator for generating ultrasound, a booster for amplifying oscillations, etc.; therefore, when disposed on a mass production line on which various equipment is arranged, the dimension of the equipment as a whole becomes large, creating a problem that space in buildings such as factories will be pressured.

In contrast, in the apparatus 100 for bonding separators in electrical devices according to the present embodiment, the horn 151, the booster 152, and the oscillator 153 which configure the separator bonding unit 150 are laid out in a plane that is parallel to the direction in which the separators are conveyed and perpendicular to the surfaces of the separators, or, the booster 152 and the oscillator 153 are laid out closer to the widthwise centers of the separators than the horn 151 is when seen from a direction that is parallel to the direction in which the separators are conveyed. So long as an assembly-line equipment is present, the dimension of the equipment in the conveyance direction of the assembly line inevitably becomes large; however, component members of the equipment are not necessarily arranged in the axial direction of the support member 118 that supports the electrode feed roller 111 and the like, such as shown in FIG. 5B. Accordingly, by arranging the horn 151, the booster 152, and the oscillator 153 along the conveyance direction X and the lamination direction Z of the separators 40, or, by laying out the booster 152 and the oscillator 153 closer to the widthwise center than the horn 151, the amount of space taken up by the apparatus as a whole can be kept small.

Further, protrusions 151$b$1 to 151$b$4 which contact the separators 40 are disposed on the horn 151 which carries out ultrasonic bonding, and the horn 151 is configured to be rotatable around a rotational axis that is parallel to the direction in which the booster 152 and the oscillator 153 are arranged. Accordingly, protrusions in diagonal positions of the protrusions 151$b$1 to 151$b$4 to be used can be replaced by an operation that rotates the horn 151; therefore, there is no need to provide a space between the horn 151 and the peripheral component members of the bonding apparatus 100 in order to replace the protrusions, and the amount of space taken up by the bonding apparatus 100 as a whole can be kept small by that amount.

In addition, the horn 151 which forms the separator bonding unit 150 is configured to be disposed closer to the position P1 in which the pair of separators 40 are superposed than the pressing member 155 which holds the horn 151. Accordingly, by not disposing the pressing member 155 from a position where the separators 40 are supplied to the position where ultrasonic bonding is started in the electrode conveyance unit 110, the position where ultrasonic bonding is started can be shortened by the amount of space taken up by the pressing member 155, which contributes to reducing the size of the assembly line in the conveyance direction.

Additionally, the horn 151 is configured so that the protrusions 151$b$ are disposed at the ends of the main body portion 151$a$ in a direction that intersects the conveyance direction X of the separator 40. Accordingly, if the protrusions 151$b$ is disposed in an overhead location of the end of the separator 40, the main body portion 151$a$ can be disposed outward, etc., of the separator 40; therefore, the ultrasonic bonding unit 150 which bonds the separators can be applied to a mass production conveyor line or the like.

In addition, multiple protrusions 151$b$ are disposed, such as the protrusion 151$b$1-protrusion 151$b$4 illustrated in FIG. 12A, and are formed so that the protrusions 151$b$1-151$b$4 to be used are capable of being replaced. Accordingly, tool life can be extended when bonding separators to each other using one horn compared to the prior art, contributing to cost reduction.

Additionally, the main body portion 151$a$ of the horn 151 is rotatably configured, and the protrusions 151$b$1-151$b$4 which contact the pair of separators 40 are configured to be replaceable by rotating the main body portion 151$a$. Accordingly, the space required for replacing the protrusions 151$b$1-151$b$4 can be kept small compared to a translational movement or the like, and replacement of the protrusions 151$b$1-151$b$4 which are used in the horn 151 can be carried out easily and quickly, contributing to the reduction of tact time.

In addition, the separator bonding unit 150 comprises an abutting member 155$a$, which is disposed on the pressing member 155 that holds the horn 151 and which can protrude and retract to and from the horn 151, and is configured to switch between rotating and fixing the main body portion 151$a$ by switching between contacting and not contacting the abutting member 155$a$ to the horn 151. Accordingly, the space required for rotating or fixing the horn 151 can be kept small.

Additionally, the horn 151 of the separator bonding unit 150 disposed in relation to the separator 40 in the conveyance direction X is configured so that the fastening direction of the screws for fastening with the booster 152 is the same. Accordingly, horns 151 disposed in pairs with respect to the conveyance direction X can be shared, contributing to cost reduction.

Modified Example of the First Embodiment

An apparatus for bonding separators embodying the method of bonding separators of the bagged electrode 11 according to a modified example of the first embodiment will be described, with reference to FIG. 13 and FIGS. 14A-14C.

Figure 13:
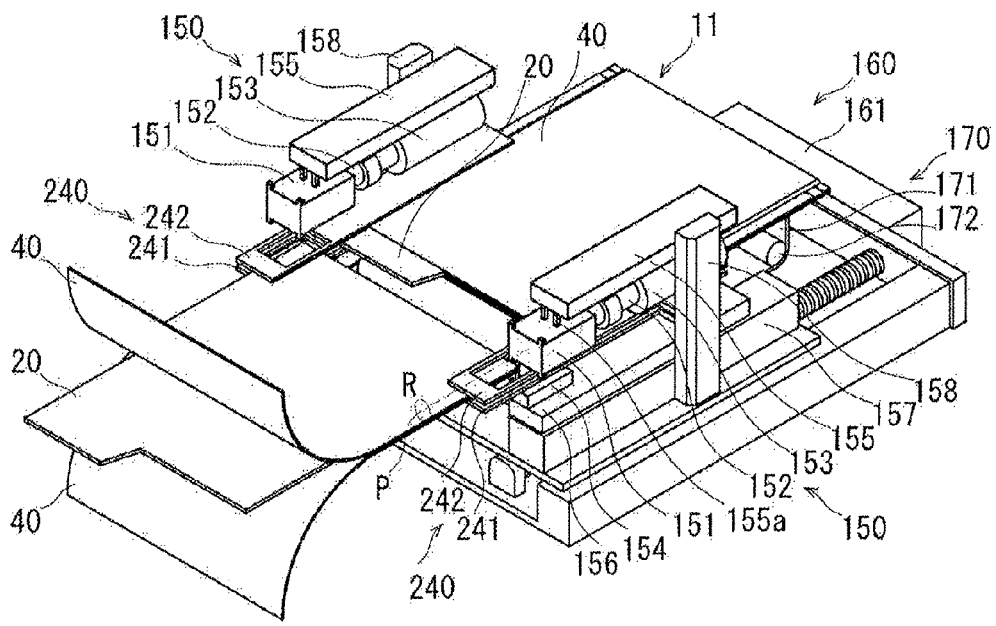
FIG. 13 is a perspective view illustrating the separator holding unit, the separator bonding unit, the separator conveyance following unit, and the bagged electrode conveyance unit in the apparatus for bonding separators in electrical devices according to a modified example of the first embodiment.
Figure 14A:
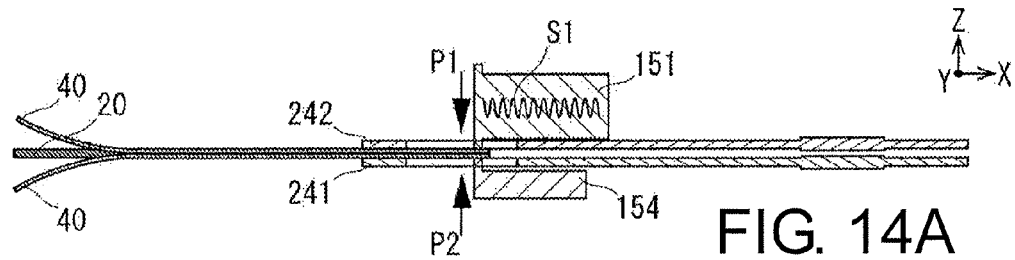
FIGS. 14A-14C are cross-sectional views illustrating the operation of the separator holding unit and the separator bonding unit of FIG. 13.
Figure 14B:
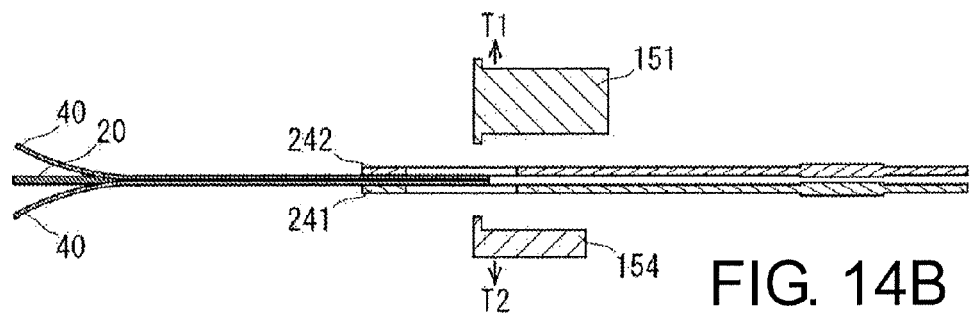
Figure 14C:
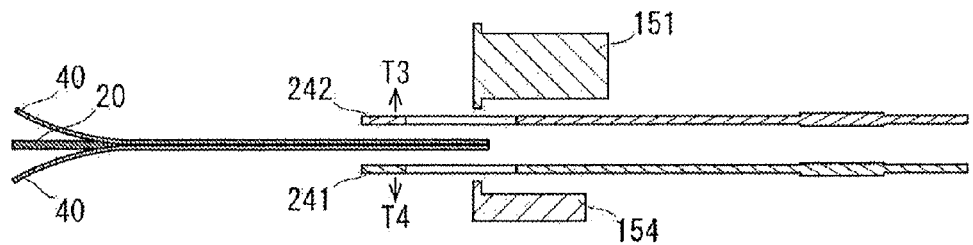

FIG. 13 is a perspective view illustrating the separator holding unit 240, the separator bonding unit 150, the separator conveyance following unit 160, and the bagged electrode conveyance unit 170 of the apparatus for bonding separators. FIGS. 14A-14C are cross-sectional views illustrating the operation of the separator holding unit 240 and the separator bonding unit 150 of FIG. 13.

The apparatus for bonding separators according to a modified example of the first embodiment is different from the apparatus 100 for bonding separators according to the first embodiment described above in a configuration which a pair of holding plates 241 and 242 are separated from the polypropylene layers 41 after the horn 151 is detached from the polypropylene layers 41 of the ceramic separator 40. In the modified example of the first embodiment, the same codes are used for configurations that are the same as the first embodiment described above, and the descriptions thereof are omitted. First, the configuration of the separator holding unit 240 will be described with reference to FIG. 13.

The separator holding unit 240 is disposed on the downstream side of the first separator conveyance unit 120 and the second separator conveyance unit 130 in the conveyance direction X. A pair of separator holding units 240 are arranged on each of the two ends of the bagged electrode conveyance unit 170 along the conveyance direction X. A holding plate 241 of the separator holding unit 240 has a an elongated plate shape, and is disposed further downward as shown in FIG. 13 than the ceramic separator 40 in the lamination direction Z, and parallel to the end of the ceramic separator 40 along the conveyance direction X. The holding plate 242 has the same shape as the holding plate 241. The holding plate 241 and the holding plate 242 are arranged facing each other along the lamination direction Z, via a pair of ceramic separators 40. The holding plate 241 includes rectangular holes in order to prevent interference with an anvil 154 of the separator bonding unit 150. On the other hand, the holding plate 242 includes rectangular holes in order to prevent interference with the horn 151 of the separator bonding unit 150. The holding plates 241 and 242 are raised and lowered so as to approach and separate from each other along the lamination direction Z by a drive strut 158 of the separator bonding unit 150.

Bonding of the Separators

Next, the action of the separator holding unit 240 will be described with reference to FIGS. 14A-14C.

The separator holding unit 240 sandwiches and holds the pair of ceramic separators 40 along the lamination direction Z with a pair of holding plates 241 and 242, as illustrated in FIG. 14A. The horn 151 and the anvil 154 carries out ultrasonic bonding of the pair of ceramic separators 40, in a state of being respectively pressed against the polypropylene layers 41. Next, as illustrated in FIG. 14B, the horn 151 is detached from the pair of ceramic separators 40 upward along the lamination direction Z as indicated by arrow T1 in FIG. 14B. The anvil 154 is detached from the pair of ceramic separators 40 downward along the lamination direction Z as indicated by arrow T2 in FIG. 14B, simultaneously with the operation of the horn 151. Next, as illustrated in FIG. 14C, the holding plate 241 is detached from the pair of ceramic separators 40 downward along the lamination direction Z as indicated by arrow T4 in FIG. 14C. The holding plate 242 is detached from the pair of ceramic separators 40 upward along the lamination direction Z as indicated by arrow T3 in FIG. 14C, simultaneously with the operation of the holding plate 241.

According to the modified example of the first embodiment described above, the action and effects are achieved by the following configurations.

The apparatus for bonding separators in electrical devices (corresponding to the bagged electrode 11 of the lithium ion secondary battery 10) further comprises a pair of holding plates 241 and 242. The pair of holding plates 241 and 242 sandwich and hold the polypropylene layers 41 to each other along the lamination direction Z. The pair of holding plates 241 and 242 separate from the polypropylene layers 41 after the horn 151 is detached from the polypropylene layers 41.

According to such a configuration, the horn 151 can be separated from the polypropylene layers 41 even if adhered to the polypropylene layers 41 when welding the pair of ceramic separators 40, in a state in which the polypropylene layers 41 are held by the pair of holding plates 241 and 242. Therefore, it is possible to prevent the horn 151 from moving in a state of being adhered to the polypropylene layers 41, and thus the ceramic separator 40 will not be damaged.

In addition, in the configuration of the modified example of the first embodiment, the anvil 154 can be separated from the polypropylene layers 41 even if adhered to the polypropylene layers 41 when welding the pair of ceramic separators 40, in a state in which the polypropylene layers 41 are held by the pair of holding plates 241 and 242. Therefore, it is possible to prevent the anvil 154 from moving in a state of being adhered to the polypropylene layers 41, and thus the ceramic separator 40 will not be damaged. Various modifications to the present invention based on the configurations described in the Claims are possible, which also belong in the scope of the present invention.

For example, the direction in which ultrasound is propagated to the ceramic separator 40 may be any direction along the bonding surface between the ceramic layers 42, which intersects the lamination direction Z, and is not particularly limited as long as the direction is within a plane formed from direction Y and the conveyance direction X which intersect the lamination direction Z.

Additionally, a configuration was described above in which opposed polypropylene layers 41 are bonded to each other by partially moving the ceramic layers 42 of the pair of ceramic separators 40 to the peripheral region and made coarse. Here, it is not necessary to move the ceramic layers 42 of the region that becomes the bonding portion completely to the peripheral region; it is sufficient to move to the extent that the ceramic layers become coarse. That is, bonding opposed polypropylene layers 41 to each other is also possible in a state in which a portion of the ceramic layers 42 remains in a region that becomes the bonding portion.

In addition, in the first and second embodiments, configurations were described in which a pair of ceramic separators 40 are bonded to each other in a bagged electrode 11 that is used in a lithium ion secondary battery 10, but the invention is not limited to such configurations. The invention may be applied to bonding members other than a bagged electrode 11 used in a lithium ion secondary battery 10.

Additionally, a configuration was described above in which the secondary battery is a lithium ion secondary battery 10, but the invention is not limited to such a configuration. The secondary battery may be configured as, for example, a polymer lithium battery, a nickel-hydrogen battery, or a nickel-cadmium battery.

In addition, a configuration was described above in which the heat-resistant material of the ceramic separator 40 is a ceramic layer 42, but the invention is not limited to such a configuration. The heat-resistant material is not limited to ceramic, and any member with a higher melting temperature than the molten material may be employed.

Additionally, a configuration was described above in which the molten material of the ceramic separator 40 is a polypropylene layer 41, but the invention is not limited to such a configuration. The molten material is not limited to polypropylene, and any member with a lower melting temperature than the heat-resistant material may be employed.

In addition, a configuration was described above in which the ceramic separator 40 is obtained by laminating a heat-resistant material (ceramic layer 42) on one surface of the molten material (polypropylene layer 41), but the invention is not limited to such a configuration. The ceramic separator 40 may be configured by laminating a heat-resistant material (ceramic layer 42) on both surfaces of the molten material (polypropylene layer 41).

Additionally, a configuration was described above in which the bagged electrode 11 is formed by bagging a positive electrode 20 with a pair of ceramic separators 40, but the invention is not limited to such a configuration. The bagged electrode may be configured to be formed by bagging a negative electrode 30 with a pair of ceramic separators 40. In addition, the bagged electrode may be configured to be formed by inserting a positive electrode 20 or a negative electrode 30 after bonding a pair of ceramic separators 40 to each other.

Additionally, a configuration was described above in which the two ends of a pair of ceramic separators 40 are spot-welded using a horn 151 and an anvil 154 including protrusions, but the invention is not limited to such a configuration. The two ends of a pair of ceramic separators 40 may be configured to be seam welded by operating the horn 151 and the anvil 154 including protrusions so that the bonding portions are continuous.

In addition, a configuration was described above in which the pair of ceramic separators 40 are sandwiched and pressed by the protrusion 151b of the horn 151 and the protrusion 154b of the anvil 154, but the invention is not limited to such a configuration. A protrusion may be disposed on only one of the horn 151 or the anvil 154. In other words, a configuration may be employed in which the pair of ceramic separators 40 are sandwiched and pressed by a protrusion 151b of the horn 151 and a flat portion of the main body portion 154a of the anvil 154. In addition, a configuration may be employed in which the portion of the pair of ceramic separators 40 that becomes the bonding portion is sandwiched and pressed by a convex protrusion 151b of the horn 151 and a concave recess of the anvil 154. Furthermore, a configuration may be employed in which the pair of ceramic separators 40 are sandwiched and pressed by one end of a flat portion of the main body portion 151a of the horn 151 and one end of a flat portion of the main body portion 154a of the anvil 154.

Additionally, an embodiment was described above in which the screws on the left and right that configure the fastening portion between the booster 152 and the horn 151, which are arranged in pairs in the vicinity of the edge of the separator 40 in the conveyance direction X in FIG. 6, are fastened in the same rotational direction, but the invention is not limited thereto. The rotational directions of the screws in the fastening portions of the horns 151 and the boosters 152, which are arranged in the vicinity of one edge and in the vicinity of the other edge of the separator 40 may be reversed, and loosening of the fastening portions between both the left and right horns 151 and boosters 152 can be prevented by setting the fastening directions of each screw to be the reverse of the rotational direction that is generated when abutting the horn 151 to the separator 40.

The invention claimed is:

1. An apparatus for bonding separators in electrical devices the separators to each other so as to sandwich an electrode, comprising:
   a transmission unit configured to generate ultrasonic oscillations;
   an amplifier unit configured to amplify the generated oscillations;
   an abutting part configured to apply the amplified oscillations to the separators so as to bond the separators to each other; and
   separator conveyance units configured to convey the separators to a bonding position where the abutting part bonds the pair of separators to each other,
   the transmission unit, the amplifier unit, and the abutting part are laid out parallel to a direction in which the separators are conveyed.

2. The apparatus for bonding separators in electrical devices according to claim 1, wherein
   the abutting part comprises multiple contact portions configured to contact the separators, and
   is configured to rotate around a rotational axis that is parallel to the direction in which the abutting part and the transmission unit are arranged.

3. The apparatus for bonding separators in electrical devices according to claim 1, further comprising
   a holding unit configured to hold the abutting part,
   the abutting part being disposed closer to a position in which the separators are superposed than the holding unit in the direction in which the separators are conveyed.

4. The apparatus for bonding separators in electrical devices according to claim 1, wherein
   the abutting part comprises a contact portion configured to contact the separators and a main body portion on which is disposed the contact portion, and
   the contact portion is disposed at an end of the main body portion in a direction that intersects the direction in which the separators are conveyed.

5. The apparatus for bonding separators in electrical devices according to claim 4, wherein
   the contact portion is one of multiple contact portions disposed on the main body portion, and
   the multiple contact portions are configured to be replaceable.

6. The apparatus for bonding separators in electrical devices according to claim 5, wherein the main body portion is configured to be rotatable, and the contact portion is configured to be replaced by rotating the main body portion.

7. The apparatus for bonding separators in electrical devices according to claim 6, further comprising:
   a holding unit configured to hold the abutting part,
   the holding unit comprises an abutting member configured to protrude and retract with respect to the abutting part, and
   the holding unit is configured to switch between rotating and fixing the main body portion by switching between contacting and not contacting the abutting member to abutting part.

8. The apparatus for bonding separators in electrical devices according to claim 1, wherein
   the amplifier unit is a first amplifier, the abutting part is a first abutting part, and the first amplifier unit and the first abutting part form a first pair, and a second amplifier unit and a second abutting part form a second pair,
   the first amplifier unit and the first abutting part are fastened by screws, and the second amplifier unit and the second abutting part are fastened by screws,
   the first and second pairs are arranged on respective sides of the separators in a width direction, and
   fastening directions of the screws of the first and second pairs are the same.

9. The apparatus for bonding separators in electrical devices according to claim 1, wherein
   the amplifier unit is a first amplifier, the abutting part is a first abutting part, and the first amplifier unit and the first abutting part form a first pair, and a second amplifier unit and a second abutting part form a second pair,
   the first amplifier unit and the first abutting part are fastened by screws, and the second amplifier unit and the second abutting part are fastened by screws,
   the first and second pairs are arranged on respective sides of the separators in a width direction, and
   fastening directions of the screws of the first and second pairs are different.

10. The apparatus for bonding separators in electrical devices according to claim 1, wherein
    the separator conveyance unit comprises a conveyance drum configured to convey separators, and
    the abutting part is disposed further outward than the conveyance drum in a width direction of the separators to be conveyed.

11. The apparatus for bonding separators in electrical devices according to claim 2, further comprising
    a holding unit configured to hold the abutting part,
    the abutting part being disposed closer to a position in which the separators are superposed than the holding unit in the direction in which the separators are conveyed.

12. The apparatus for bonding separators in electrical devices according to claim 10, further comprising
    a holding unit configured to hold the abutting part,
    the abutting part being disposed closer to a position in which the separators are superposed than the holding unit in the direction in which the separators are conveyed.

13. The apparatus for bonding separators in electrical devices according to claim 2, wherein
    the abutting part comprises a contact portion configured to contact the separators and a main body portion on which is disposed the contact portion, and the contact portion is disposed at an end of the main body portion in a direction that intersects the direction in which the separators are conveyed.

14. The apparatus for bonding separators in electrical devices according to claim 3, wherein
the abutting part comprises a contact portion configured to contact the separators and a main body portion on which is disposed the contact portion, and
the contact portion is disposed at an end of the main body portion in a direction that intersects the direction in which the separators are conveyed.

15. The apparatus for bonding separators in electrical devices according to claim 10, wherein
the abutting part comprises a contact portion configured to contact the separators and a main body portion on which is disposed the contact portion, and
the contact portion is disposed at an end of the main body portion in a direction that intersects the direction in which the separators are conveyed.

16. The apparatus for bonding separators in electrical devices according to claim 2, wherein
the amplifier unit is a first amplifier, the abutting part is a first abutting part, and the first amplifier unit and the first abutting part form a first pair, and a second amplifier unit and a second abutting part form a second pair,
the first amplifier unit and the first abutting part are fastened by screws, and the second amplifier unit and the second abutting part are fastened by screws,
the first and second pairs are arranged on respective sides of the separators in a width direction, and
fastening directions of the screws of the first and second pairs are different.

17. The apparatus for bonding separators in electrical devices according to claim 4, wherein
the amplifier unit is a first amplifier, the abutting part is a first abutting part, and the first amplifier unit and the first abutting part form a first pair, and a second amplifier unit and a second abutting part form a second pair,
the first amplifier unit and the first abutting part are fastened by screws, and the second amplifier unit and the second abutting part are fastened by screws,
the first and second pairs are arranged on respective sides of the separators in a width direction, and
fastening directions of the screws of the first and second pairs are different.

18. The apparatus for bonding separators in electrical devices according to claim 3, wherein
the amplifier unit is a first amplifier, the abutting part is a first abutting part, and the first amplifier unit and the first abutting part form a first pair, and a second amplifier unit and a second abutting part form a second pair,
the first amplifier unit and the first abutting part are fastened by screws, and the second amplifier unit and the second abutting part are fastened by screws,
the first and second pairs are arranged on respective sides of the separators in a width direction, and
fastening directions of the screws of the first and second pairs are different.

19. The apparatus for bonding separators in electrical devices according to claim 5, wherein
the amplifier unit is a first amplifier, the abutting part is a first abutting part, and the first amplifier unit and the first abutting part form a first pair, and a second amplifier unit and a second abutting part form a second pair,
the first amplifier unit and the first abutting part are fastened by screws, and the second amplifier unit and the second abutting part are fastened by screws,
the first and second pairs are arranged on respective sides of the separators in a width direction, and
fastening directions of the screws of the first and second pairs are different.

20. The apparatus for bonding separators in electrical devices according to claim 6, wherein
the amplifier unit is a first amplifier, the abutting part is a first abutting part, and the first amplifier unit and the first abutting part form a first pair, and a second amplifier unit and a second abutting part form a second pair,
the first amplifier unit and the first abutting part are fastened by screws, and the second amplifier unit and the second abutting part are fastened by screws,
the first and second pairs are arranged on respective sides of the separators in a width direction, and
fastening directions of the screws of the first and second pairs are different.

* * * * *